(12) United States Patent
Hu et al.

(10) Patent No.: US 7,426,653 B2
(45) Date of Patent: Sep. 16, 2008

(54) FAULT TOLERANT DISTRIBUTED LOCK MANAGEMENT

(75) Inventors: Carl Hu, Arlington, MA (US); Frederick A. Tompkins, Jr., Londonderry, NH (US); Michael Teixeira, Reading, MA (US)

(73) Assignee: Progress Software Corporation, Bedford, MA (US)

( * ) Notice: Subject to any disclaimer, the term of this patent is extended or adjusted under 35 U.S.C. 154(b) by 511 days.

(21) Appl. No.: 11/270,196

(22) Filed: Nov. 8, 2005

(65) Prior Publication Data
US 2006/0253856 A1 Nov. 9, 2006

Related U.S. Application Data

(60) Provisional application No. 60/671,373, filed on Apr. 13, 2005.

(51) Int. Cl.
*G06F 11/00* (2006.01)
(52) U.S. Cl. ............................. 714/4; 714/15; 714/21
(58) Field of Classification Search .................. 714/4, 714/15, 21
See application file for complete search history.

(56) References Cited

U.S. PATENT DOCUMENTS

| | | | | |
|---|---|---|---|---|
| 6,052,695 | A * | 4/2000 | Abe et al. ................... | 707/202 |
| 6,154,847 | A * | 11/2000 | Schofield et al. ............... | 714/4 |
| 6,178,519 | B1 * | 1/2001 | Tucker ........................ | 714/4 |
| 6,353,869 | B1 * | 3/2002 | Ofer et al. ................... | 710/200 |
| 6,493,726 | B1 * | 12/2002 | Ganesh et al. ............... | 707/201 |
| 6,574,749 | B1 * | 6/2003 | Parsons ....................... | 714/15 |
| 6,578,159 | B1 * | 6/2003 | Kitagawa et al. ............. | 714/15 |
| 6,665,814 | B2 * | 12/2003 | Hobson et al. ............... | 714/16 |
| 6,898,791 | B1 * | 5/2005 | Chandy et al. ............... | 719/314 |
| 7,146,366 | B2 * | 12/2006 | Hinshaw et al. ............... | 707/8 |
| 7,356,531 | B1 * | 4/2008 | Popelka et al. ............... | 707/8 |
| 2002/0194523 | A1 * | 12/2002 | Ulrich et al. ................... | 714/4 |
| 2005/0022047 | A1 * | 1/2005 | Chandrasekaran ............ | 714/4 |
| 2006/0129872 | A1 * | 6/2006 | Fung et al. ..................... | 714/4 |

OTHER PUBLICATIONS

Kemme, B., "Database Replication for Clusters of Workstations," Dissertation, Swiss Federal Institute of Technology Zurich, 2000 [Retrieved on Jul. 9, 2007] Retrieved from the Internet<URL:http://www.cs.mcgill.ca/~kemme/papers/phd-dina4.pdf>.

(Continued)

*Primary Examiner*—Bryce P Bonzo
(74) *Attorney, Agent, or Firm*—Fenwick & West LLP

(57) ABSTRACT

Distributed transaction and lock management techniques are disclosed that manage and regulate access to distributed data. A lock manager module is provided for regulating access to resources by applications in a system having a number of nodes each communicatively coupled to a network. The module can be configured to be fault tolerant. In one embodiment, the module uses a totally ordered transport that imposes total ordering protocols on messaging between nodes. The module can exploit the multicast ability of the network (e.g., Ethernet or other network features that enable multicast). The module includes a queue for each resource, the queue identifying the node that owns distributed lock for that resource. Each queue can be replicated across the nodes in a distributed configuration.

40 Claims, 7 Drawing Sheets

OTHER PUBLICATIONS

International Search Report and Written Opinion, PCT/US06/14064, Sep. 26, 2007, 9 pages.

Agrawal, Divyakant et al., "Exploiting Atomic Broadcast in Replicated Databases," 1997, 8 pages [online] [Retrieved on Jan. 30, 2006] Retrieved from the Internet: <URL:http://citeseer.ist.psu.edu/cache/papers/cs/1240/http:zSzzSzwww.cs.ucsb.eduz~ioanazSzeuropar97.pdf/agrawal96exploiting.pdf>.

Amir, Yair et al., "From Total Order to Database Replication, Technical Report CNDS-2001-6," Nov. 5, 2001, 26 pages [online] [Retrieved on Jan. 30, 2006] Retrieved from the Internet: <URL: http://www.cnds.jhu.edu/pub/papers/cnds-2001-6.pdf>.

Gray, Jim et al., "The Dangers of Replication and a Solution," 1996, pp. 173-182 [online] [Retrieved on Jan. 30, 2006] Retrieved from the Internet: <URL: http://www-2.cs.cmu.edu/~natassa/courses/15-823/F02/papers/ gray96danger.pdf>.

Moser, L.E. et al., "Extended Virtual Synchrony," 1994, 10 pages [online] [Retrieved on Jan. 30, 2006] Retrieved from the Internet: <URL: http://www.cs.jhu.edu/~yairamir/dcs-94.ps>.

Schneider, Fred B., et al., "Implementing Fault-Tolerant Services Using the State Machine Approach: A Tutorial," ACM Computing Surveys, Dec. 1990, vol. 22, No. 4, pp. 299-319 [online] [Retrieved on Jan. 30, 2006] Retrieved from the Internet: <URL:http://www.cs.cornell.edu/fbs/publications/SMSurvey.pdf>.

Stanoi, I. et al., "Using Broadcast Primitives in Replicated Databases," Proceedings of ICDCS '98, May 1998, Amsterdam, The Netherlands, 8 pages [online] [Retrieved on Jan. 30, 2006] Retrieved from the Internet: <URL: http://www.cs.ucsb.edu/~dsl/publications/1998/stanoi_icdcs.pdf>.

Vitenberg, Roman et al., "Group Communication Specifications: A Comprehensive Study," Sep. 17, 1999, 50 pages [online] [Retrieved on Jan. 30, 2006] Retrieved from Internet: <URL: http://theory.lcs.mit.edu/~idish/ftp/gcs-survey-tr.pdf>.

* cited by examiner

FAULT TOLERANT DISTRIBUTED LOCK MANAGEMENT

RELATED APPLICATIONS

This application claims the benefit of U.S. Provisional Application No. 60/671,373, filed on Apr. 13, 2005, which is herein incorporated in its entirety by reference.

FIELD OF THE INVENTION

The invention relates to distributed systems, and more particularly, to distributed mutual exclusion protocols.

BACKGROUND OF THE INVENTION

Modern computer systems typically consist of a CPU to process data, a networking interface to communicate to other computer systems, and one or more durable storage units. The system may stop processing, for example, due to power failure, program incorrectness, or a hardware fault. Such failures are often called process failures. The durable storage units are able to keep the data intact while the fault is repaired.

A set of these computer systems can be networked to form a cluster. Although the network is generally reliable, occasional faults may occur to disrupt communication between certain nodes or sets of nodes. This disruption in communication is often called a network partition.

Each of the nodes runs a transactional storage system that both reads and writes data (a database management system). Some of this data is concurrently accessed by applications operating on different nodes. To guarantee data consistency, distributed transaction and lock management techniques are used to manage and regulate access to that data. However, conventional distributed transaction and lock management techniques are associated with a number of problems.

For example, conventional systems typically exhibit poor performance of lock transfer. In more detail, as several programs contend for the same shared resources, access grants must be transferred as quickly as possible from one program and/or node to the next. Access grants must guarantee fairness so that all programs have a chance to access the resource eventually, providing freedom from livelock. Existing distributed memory lock algorithms assume the primitive of an ordered unicast (also called point-to-point) messaging layer (e.g., TCP/IP) and attempt to optimize the use of message traffic typically by imposing a virtual hierarchical tree topology on the communications paths across the nodes. Despite improvements achieved in this area, as the number of nodes in a cluster increases, the increase in message traffic and the associated processing costs and delays causes the performance of all of these algorithms to degrade dramatically as the number of nodes increase beyond a relatively small number.

Conventional systems are also susceptible to network or process failure. Networks, computer systems, and the processes running on those computer systems occasionally fail. In such situations, conventional algorithms either stop working (e.g., stop granting locks on all nodes) or work incorrectly (e.g., the algorithm does not provide the same guarantees or semantics that the algorithm provides in a faultless environment, for example, by granting locks on some nodes when the locks have not been released yet).

Conventional systems also exhibit poor scalability for resource ownership transfer. In most conventional algorithms, the acquisition and the release of N resources requires numerous messages (worst case N*M where M is the number of nodes, but best cases are typically log(N) or log(M)) to successfully transfer the ownership of a lock from one node to another). In addition, many messages are required for hierarchical lock ownership transfer. In most conventional algorithms, the support for hierarchical locking (also called multi-granular locking) requires multiple messages for each acquisition of ownership of a distributed resource.

What is needed, therefore, are better distributed transaction and lock management techniques.

SUMMARY OF THE INVENTION

One embodiment of the present invention provides a distributed lock management system having a number of nodes each communicatively coupled to a network. The system includes a database at each node, for storing resources used by applications operating at one or more of the nodes. The system also includes a fault tolerant distributed lock manager (FTDLM) module at each node, for regulating access to the resources by the applications. The FTDLM module has a queue for each resource, the queue identifying the node that owns distributed lock for that resource. Each queue is replicated across the nodes. The system also includes a total order transport module at each node, for communicatively coupling that node to the network, and imposing total ordering protocols on messaging between nodes. The total order transport module can be integrated into the FTDLM module, or exist separately. In one particular case, the resources stored in any one database can be concurrently accessed by applications operating on different nodes, and data consistency is maintained even in the face of process failure or network partitions. The queues in the FTDLM module can be, for example, FIFO queues, and distributed lock ownership for each corresponding resource is transferred to waiting nodes identified in the queue in FIFO order. The total order transport module can be implemented, for example, as an Extended Virtual Synchrony Transport. In one particular case, the total order transport module exploits multicast capabilities of the network to deliver messages with ordering guarantees. In another particular case, if a node owns distributed lock for a resource, and no other nodes are waiting for that resource, then the FTDLM module allows an unlimited number of transactions on that resource to run concurrently or sequentially. In another particular case, if a node X owns distributed lock for a resource, and other nodes are waiting for that resource, then the FTDLM module allows a predefined number of in-flight transactions on that resource to run and commit, and then releases ownership of the distributed lock. In one such case, the node X is placed in the queue once the FTDLM module releases ownership of the distributed lock, and upon the other nodes completing use of the resource, node X re-acquires ownership of the distributed lock. When distributed lock ownership for a resource is transferred to a node, the FTDLM module may allow all transactions waiting for that resource to execute concurrently. After commit of all transactions at a node that are using a distributed lock, the FTDLM module may keep ownership of that lock at that node until or unless another node requests the distributed lock. The FTDLM module may employ scheduling to ensure that resource access is distributed among the nodes with a degree of fairness. The queues can be updated in transient memory during normal forward processing. In one such case, the queues are FIFO queues, and top elements of each queue are copied into and read from durable storage when faults are detected or are recovered from. The FTDLM module can be configured for acquiring and releasing multiple distributed locks across nodes in one safe totally ordered broadcast by batching enqueues and dequeues of several distributed locks in a single multicast message. In one such case, the single multicast message is used for a hierarchical lock ownership transfer. The system may exploit extended virtual synchrony semantics of the total order transport to implement a membership quorum-based failure recovery system, where an agreed upon membership is persisted locally at each node.

Another embodiment of the present invention provides a distributed lock manager module for regulating access to resources by applications in a system having a number of nodes each communicatively coupled to a network. The module includes a queue for each resource, the queue identifying the node that owns distributed lock for that resource. Each queue can be replicated across the nodes. The module also includes (or is operatively coupled to) a total order transport module, for communicatively coupling its node to the network, and imposing total ordering protocols on messaging between nodes. The module may also include a quorum calculation state machine coupled to the total order transport module, for guaranteeing mutual exclusion even in the face of network partitions and process failures, based on locally persisted membership. The module may also include n lock queue state machines, where n is the number of resources, each lock queue state machine for maintaining the queues and initiating ownership transfer of distributed locks. The module may also include a lock manager state machine for acquiring distributed locks for an application requesting access to one or more of the resources, and notifying the appropriate lock queue state machine to process the request. The module may include durable storage for storing queue elements indicating current lock ownership when faults are detected or are recovered from. In one such embodiment, and in cases where all nodes simultaneously crash, the module is further configured with FPMS (forward processing member set) capability, whereby a set of reachable nodes is persisted by each node on enter and exit to and from a quorum state, thereby enabling failure recovery despite total loss of transient state. In one such case, an initial previous quorum is a complete membership (all nodes), and a quorum state is established if a majority of a previous quorum is detected in a current set of reachable nodes. In cases where a failed node recovers and reattaches to an operational group, the module may update data of the recovering node by having an up-to-date node send the recovering node necessary data. In one particular case, if the module's node owns distributed lock for a resource, and no other nodes are waiting for that resource, then the module allows an unlimited number of transactions on that resource to run concurrently or sequentially. In another particular case, if the module's node owns distributed lock for a resource, and other nodes are waiting for that resource, then the module allows a predefined number of in-flight transactions on that resource to run and commit, and then releases ownership of the distributed lock. In one such case, the module's node is placed in the queue once the module releases ownership of the distributed lock, and upon the other nodes completing use of the resource, the module's node re-acquires ownership of the distributed lock. When distributed lock ownership for a resource is transferred to the module's node, the module may allow all transactions waiting for that resource to execute concurrently. After commit of all transactions at a node that are using a distributed lock, the module may keep ownership of that lock at that node until or unless another node requests the distributed lock. The module may allow N transactions to run before a distributed lock is released. Other structure and functionality of the module will be apparent in light of this disclosure (e.g., similar to the module previously described in the distributed lock management system).

Another embodiment of the present invention provides a distributed lock manager method for regulating access to resources by applications in a distributed database system having a number of nodes each communicatively coupled to a network. The method includes providing a queue for each resource, and identifying, based on queue content, the node that owns distributed lock for the resource corresponding to that queue. The method further includes replicating each queue across the nodes. The method further includes imposing total ordering protocols on messaging between nodes. The method may further include one or more of: guaranteeing mutual exclusion even in the face of network partitions and process failures, based on locally persisted membership; maintaining the queues and initiating ownership transfer of distributed locks; and acquiring distributed locks for an application requesting access to one or more of the resources, and processing the request. ( The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF THE INVENTION

Figure 1:
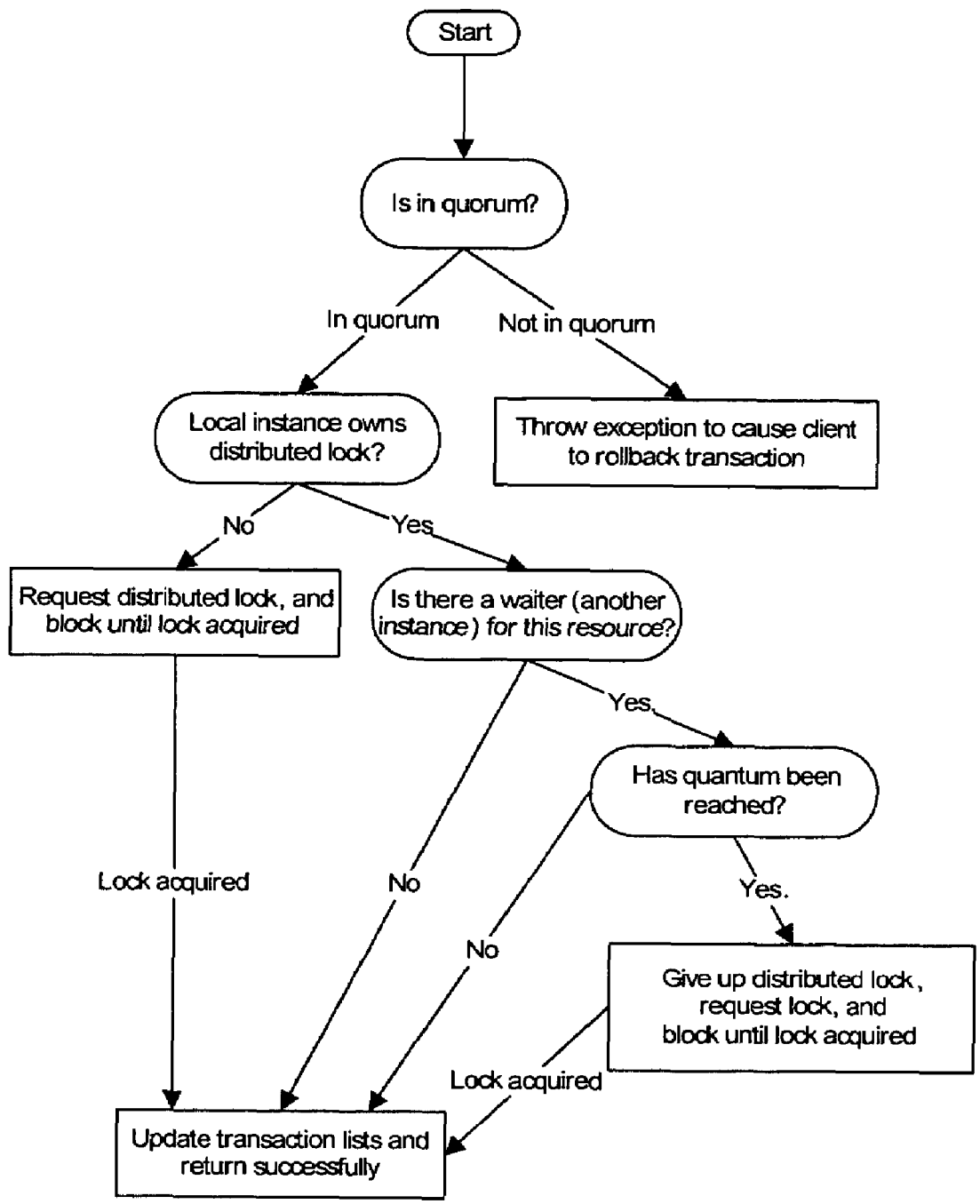
FIG. 1 illustrates a method for determining if lock for a distributed resource is appropriate, in accordance with one embodiment of the present invention.

Distributed transaction and lock management techniques are disclosed that manage and regulate access to distributed data. The previously discussed issues of poor performance of lock transfer, susceptibility to network or process failure, poor scalability for resource ownership transfer, and many messages required for hierarchical lock ownership transfer can each be eliminated or otherwise improved upon by one or more embodiments of the present invention.

General Overview

An embodiment of the present invention provides self-contained design of a distributed and fault tolerant transaction and lock management system (generally referred to herein as FTDLM). The FTDLM can be implemented, for example, as a component of decision support system (DSS) replication technology. In such an implementation, the FTDLM is capable of interacting with other components of the system, as will be understood in light of this disclosure. A variant of such an implementation is disclosed herein, where all dependencies on other components are removed. The disclosed design and techniques enable a self-contained implementation of a distributed and fault tolerant transaction and lock management system.

In one example configuration, the FTDLM implements distributed transaction management and 2-phase-locking (often called 2PL) for resources that are concurrently accessed from multiple nodes distributed across and connected by a network. Each node is termed a "member" and a set of nodes is called a "coordination group." This example configuration assumes that each of the nodes has previously agreed on the complete set of nodes which constitute the membership of the coordination group. Each node (or member) locally stores the membership on persistent storage (durable across process and power failure). Multiple applications can concurrently use the FTDLM on each node.

The example configuration of the FTDLM implements standard transactional 2-phase-locking semantics and behaves similarly to a typical lock manager and transaction manager. A client of this component calls BeginTransaction( ), requests exclusive access to resources within the context of that transaction via Lock( ), and commits the transaction via a call to TransactionCompleted( ). The distributed locks are available for release after the commit. Unlike conventional implementations of these components, however, the FTDLM does not directly interact with components like Access Methods (which implement facilities like B-Trees to manipulate data) or the Log Manager (used to persist updates transactionally). The FTDLM can be used in a variety of ways in conjunction with these traditional components, as will be apparent in light of this disclosure.

The FTDLM is designed to operate correctly, guaranteeing mutual exclusion and 2PL, even in the face of process and network failures. Safety is guaranteed. In addition, FTDLM maintains liveness (the ability to continue processing) should quorum be attainable among the surviving members: even when failures occur, it remains possible in most cases to continue to acquire or release locks and begin and commit transactions. When these hardware or software failures are repaired, the system is able to incorporate the recovering nodes into the online group automatically and without taking the system offline. The FTDLM is designed to be as fast as possible and exploits properties of underlying networking hardware characteristics such as efficient multicast message delivery.

Note that the functions of the lock manager can be segregated, or otherwise exist independently. For instance, in one particular embodiment, the lock manager can be implemented without fault tolerance, if so desired. Likewise, a fault tolerant lock manager configured in accordance with another embodiment can be implemented in a non-distributed system.

User Model and Decision Tree for Lock

The user model of the FTDLM can be implemented in a number of ways, as will be apparent in light of this disclosure. In one particular embodiment, the FTDLM exposes all of its functionality to clients via a concise API including three functions: TransactionID BeginTransaction( ), Lock(TransactionID, NameOfResource), and TransactionCompleted (TransactionID).

TransactionID BeginTransaction( ): This function call does not involve network operations and therefore executes efficiently. A call to this function is allowed to succeed even when the local node is not part of a quorum. This logic is convenient, for example, in use cases where clients acquire exclusive locks when updating data but not when reading data. In this case, the logic allows clients to begin and commit read-only transactions even when not connected to quorum.

Lock(TransactionID, NameOfResource): The FTDLM guarantees that the lock is exclusively acquired if this function returns successfully. FIG. 1 illustrates a-decision tree diagram that specifies the precise behavior of this call, in accordance with one embodiment of the present invention. The logic is designed such that: 1) repeated acquisitions of the same lock do not require network messages, 2) transactions that update data when the local instance does not have quorum are aborted, 3) multiple transactions that require the same resource are allowed to execute concurrently locally (with correctness guaranteed by a separate non-distributed lock management system), 4) fairness is guaranteed even when a greedy node never lets go of the resource; and 5) performance is improved by implementing a "quantum" whereby N transactions are allowed to execute for each lock transfer.

In the diagram of FIG. 1, unified modeling language (UML) conventions are adopted whereby circles represent decision issues, arrows are the answers, and rectangles are the resulting actions. If the function throws an exception, the user of this function can undo any actions, for example, by calling Rollback( ) on the user's database transaction. As can be seen, the first decision of the tree is whether the local node is in quorum. If not, the resulting action includes throwing an exception to cause the client to rollback the transaction. However, if the local node is in quorum, the next decision includes determining if the local instance (e.g., application such as spreadsheet or word processor) owns the distributed lock. If not, the resulting action includes requesting distributed lock, and blocking until lock is acquired. Once lock is acquired, the resulting action further includes updating the transaction list(s), and returning control back to the user of the function. However, if the local instance does own the distributed lock, then the next decision includes determining if there is a "waiter" (another local/remote instance) for this resource. If not, the resulting action includes updating the transaction list(s), and returning control back to the user of the function. However, if there is a waiter for the resource, then the next decision includes determining if a quantum has been reached. If not, the resulting action includes updating the transaction list(s), and returning control back to the user of the function. However, if a quantum has been reached, then the resulting action includes giving up the distributed lock, requesting lock, and blocking until lock is acquired. Once lock is acquired, the resulting action further includes updating the transaction list(s), and returning control back to the user of the function.

TransactionCompleted(TransactionID): Calling this function informs the FTDLM so that it can release all locks acquired in the transaction.

In one particular case, the FTDLM does not assist the user in executing or persisting operations. Rather, the FTDLM implements a 2-phase locking semantic, so that exclusive ownership of a resource is acquired and guaranteed to be maintained from the time the call to Lock( ) returns to the time that TransactionCompleted( ) is called. These semantics are designed so that the FTDLM component can be combined with other components like a Log Manager and Access Methods to implement a distributed database system, a distributed replication system, and other applications that require mutual exclusion with high reliability, availability, and performance.

System Architecture

Figure 2:
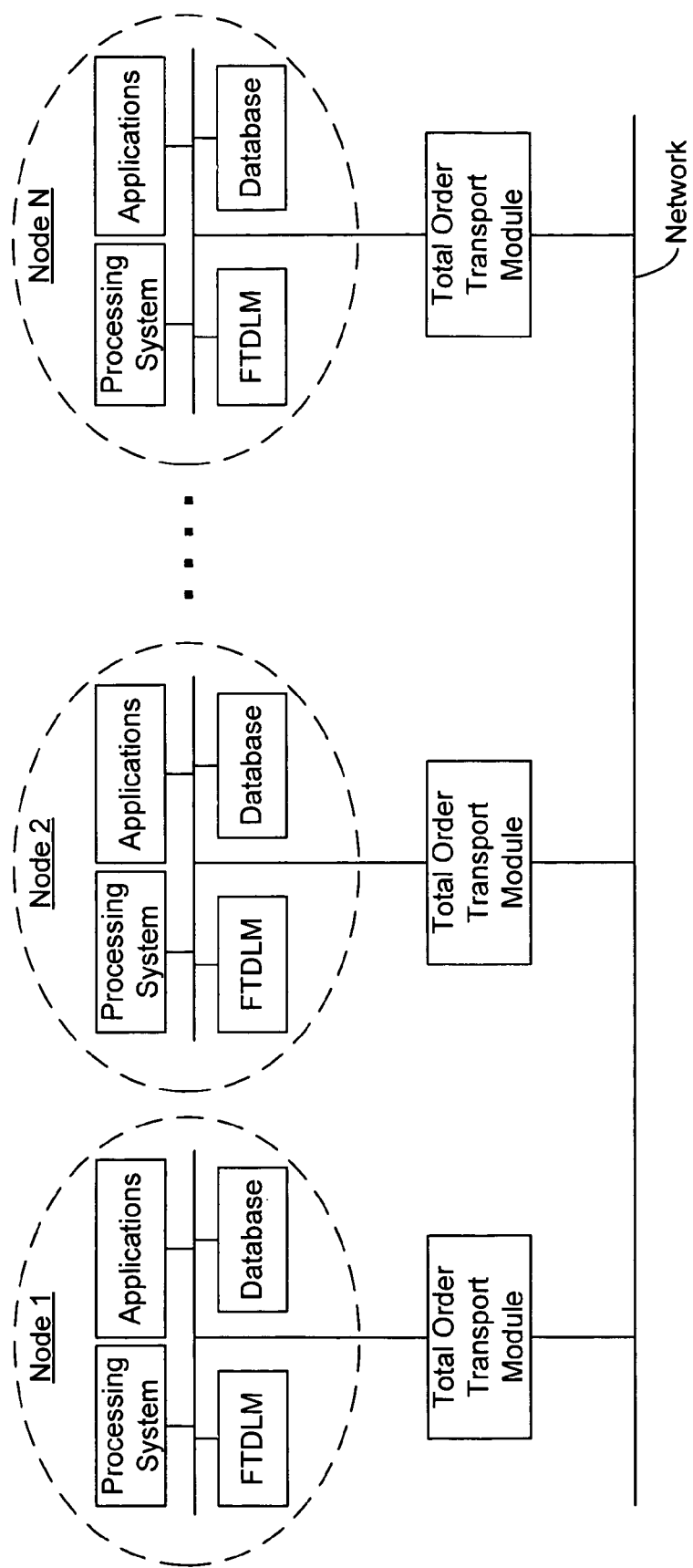
FIG. 2 is a block diagram of a fault tolerant distributed lock management system configured in accordance with one embodiment of the present invention.

FIG. 2 is a block diagram of a distributed lock management system configured in accordance with one embodiment of the present invention.

As can be seen, the system includes a number (N) of nodes each communicatively coupled to a network via a total order transport module. Each node includes a processing system capable of executing one or more applications that can access the local database of that node. In addition, applications from one particular node can access the databases of other nodes. Thus, the resources stored in any one database can be concurrently accessed by applications operating on different nodes. A fault tolerant distributed lock manager (FTDLM) module local to each database is programmed or otherwise configured to manage and regulate access to the resources stored therein. Data consistency is maintained even in the face of process failure or network partitions. Recall that a set of nodes including the database replicas is referred to herein as a coordination group.

Figure 4:
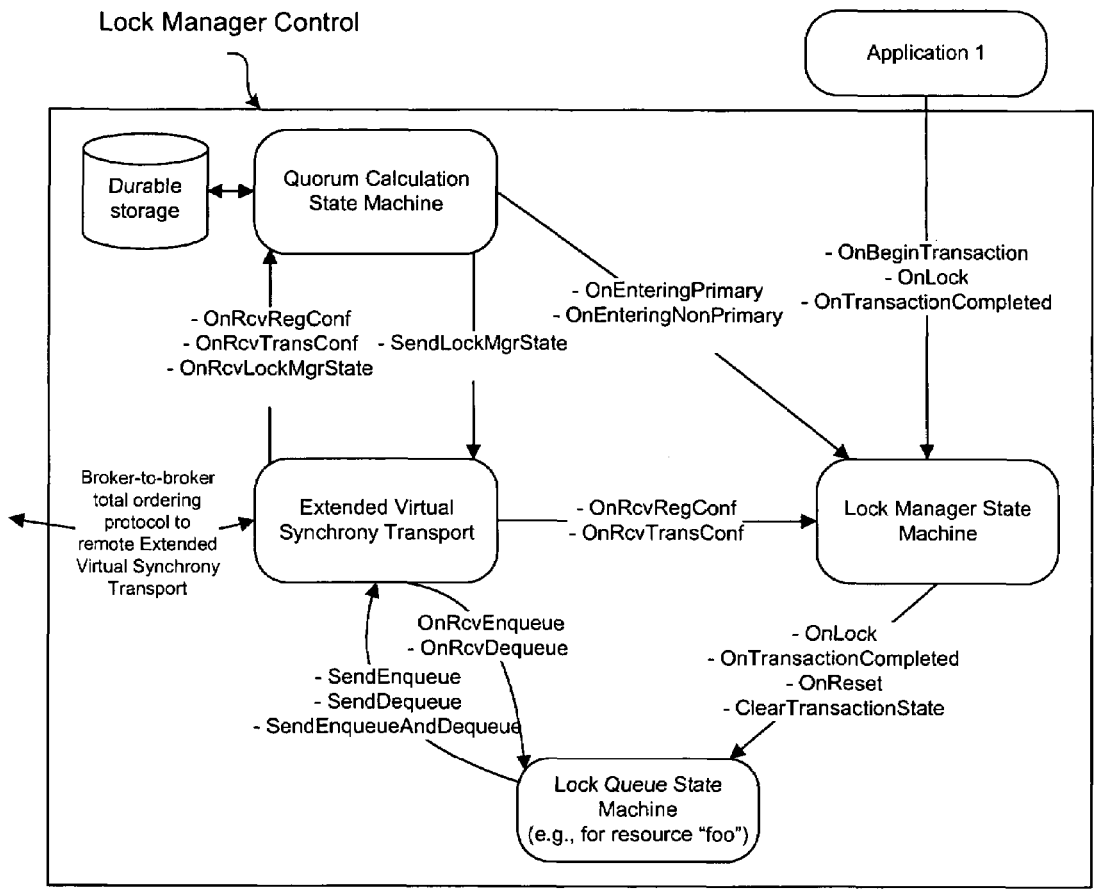
FIG. 4 is a block diagram of a lock manager control module of FIG. 3, configured in accordance with one embodiment of the present invention.

The processing system of each node can be any kind of computing system, such as a server, work station, laptop, or personal digital assistant. Although each of the FTDLM module, applications, and database of each node are shown as distinct components in this example embodiment, other configurations can be used as well. For example, any one or all of these components can be programmed or otherwise integrated into the processing system. Similarly, the total order transport module can be integrated into the FTDLM module (as shown in FIG. 4, for example). Conventional or custom networking and/or inter-process protocols and techniques can be used to carryout communication between the components in any one node, as well as between nodes. In addition, wired and/or wireless technology can be employed for intra-node and inter-node communication.

Each application within any node has access to its local database, as well as access to the databases of other nodes. In general, an application is any program or system that can read, add, delete, modify, update, or otherwise manipulate data stored in one or more of the databases included in the distributed system. The applications can be, for example, user activated (e.g., banking or accounting software), or automatically activated by a system (e.g., inventory control software programmed to run automatically on a daily basis).

The database of each node stores the resources that are used by one or more of the applications. The organization of the databases can be the same (e.g., all relational databases) or different (e.g., some relational and some object oriented databases). Any type or combination of data storage facilities can be used here.

The total order transport module imposes an ordering on all data items in the global model, and can be implemented using conventional total order techniques. In one particular embodiment, the total order transport module is implemented as described in "From Total Order to Database Replication", by Yair Amir and Ciprian Tutu, John Hopkins University, Department of Computer Science. Likewise, the total order transport module can be implemented as described in "Extended Virtual Synchrony", L. E. Moser, Y. Amir, P. M. Melliar-Smith, and D. A. Agarwal, University of California at Santa Barbara, Department of Electrical and Computer Engineering. Note that these papers are available online, and are also included in Appendix B of the previously incorporated U.S. Provisional Application No. 60/671,373. Further note that an Extended Virtual Synchrony Transport is one specific implementation of a total order transport module.

Unlike conventional distributed lock management techniques, one embodiment of the present invention exploits multicast communication protocols, thereby enabling significant performance and scalability advantages, and improves upon the poor performance of lock transfer problem. The cost associated in using multicast protocols to deliver a message to N nodes (cost is O(1)) is significantly less than using unicast protocols to deliver that same message to N nodes (cost is O(n)). Virtual synchronous totally ordered transports have been developed that use the multicast capabilities of commonly used networking hardware (e.g., Ethernet) to deliver messages with certain ordering guarantees efficiently and scalably, and with well defined semantics in the event of process or network failure. In one particular embodiment of the present invention, the distributed lock algorithm by Leslie Lamport (often called the Bakery Algorithm) is modified to exploit the power of totally ordered transports, thereby implementing a robust distributed lock and transaction management.

Also, an embodiment of the present invention can be configured to eliminate or otherwise reduce the susceptibility to network or process failure problem, by exploiting failure semantics provided by virtual synchrony transports to implement a quorum (weighted majority vote consensus) based failure recovery system. In addition, in many cases only 1 multicast message transmission is required to transfer ownership of N resources among M members. Such an embodiment addresses the problem of poor scalability for resource ownership transfer. This single multicast message technique can be extended to also solve the many messages required for hierarchical lock ownership transfer problem.

As previously explained, the FTDLM module local to each database operates to manage and regulate access to the resources stored therein. The FTDLM module, and its use in conjunction with a totally ordered transport module, will be discussed in more detail with reference to FIGS. 3-7.

Fault Tolerant Distributed Lock Manager (FTDLM)

Figure 3:
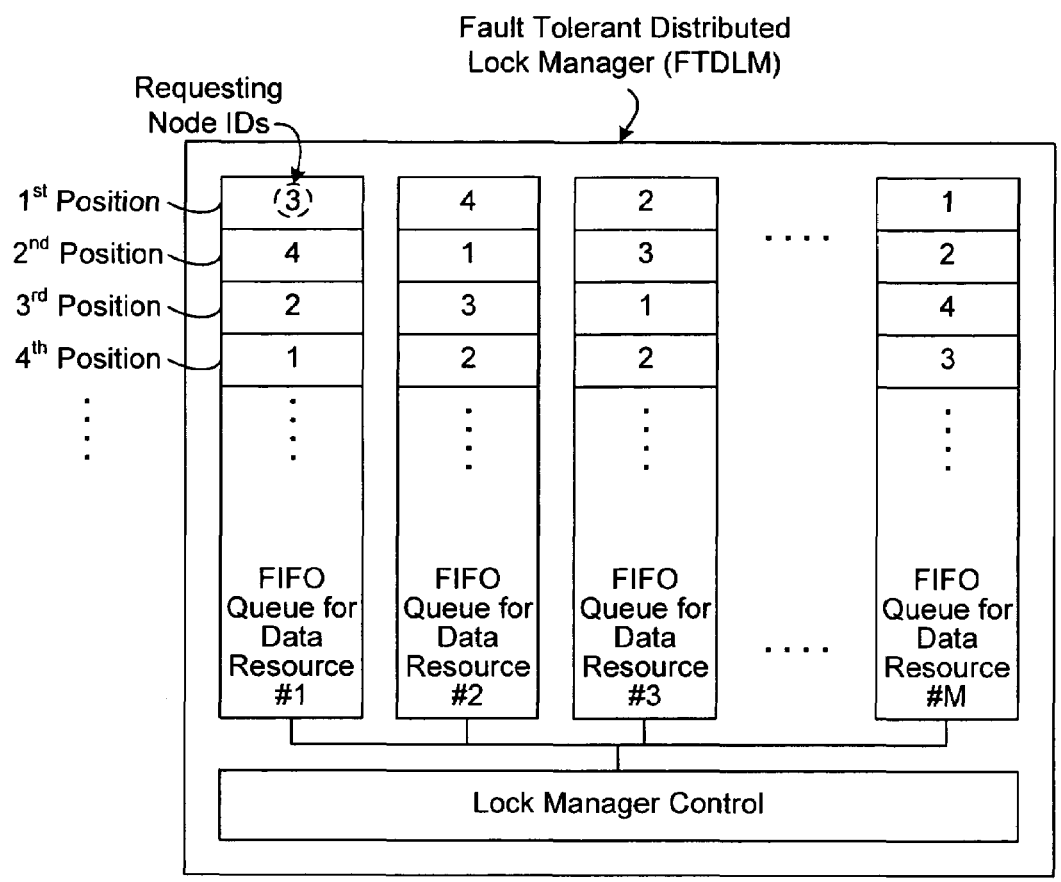
FIG. 3 is a block diagram of a fault tolerant distributed lock manager (FTDLM) module of FIG. 2, configured in accordance with one embodiment of the present invention.

FIG. 3 is a block diagram of a fault tolerant distributed lock manager (FTDLM) module of FIG. 2, configured in accordance with one embodiment of the present invention. As can be seen, the FTDLM module includes a number of FIFO queues (one queue for each of M resources) and a lock manager control module. The lock manager control module generally controls the functionality of the FTDLM module, as will be discussed in more detail with reference to FIGS. 4-7. In one such embodiment, the FTDLM is implemented with software (e.g., set of instructions executing on a processor or encoded on a processor readable medium). Alternatively, the FTDLM can be implemented, for example, in hardware (e.g., gate-level logic) or a combination of hardware and software (e.g., microcontroller with a number of embedded routines for carrying out the functionality described herein).

In a coordination group (or set of nodes), each member (or node) has a persistent record of a unique identifier associated with it. In addition, each member also has a persistent record of all of the unique identifiers of the other members of the coordination group. These unique identifiers are designated as "requesting node IDs" in FIG. 3. Note that this membership information can be distributed and persisted using conventional techniques. Thus, assume that the contents of a list of uniquely identified members is the same on all members of the coordination group when the FTDLM is executed.

The FTDLM of the example embodiment shown in FIG. 2 is a peer-to-peer design, in that there is no centralized component of the cluster that owns the authoritative record of lock ownership. Each member executes a symmetrical instance of state machines included in the FTDLM module of FIG. 3 (and discussed in more detail with reference to FIGS. 4-7). The logic executed at each member is identical but provides mutual exclusion guarantees identical to that provided by single-authority lock manager designs but with certain advantages with respect to performance and fault tolerance. In one particular embodiment, and in order to ensure high performance, all data structures during normal operation reside in transient memory. A portion of the transient data structures are persisted when failures or recovery from failures occur, to ensure a high degree of reliability in the event of failure.

As can be seen with reference to FIG. 3, each distributed lock (i.e., each data source accessible to the system) is associated with a FIFO queue. Each element of the queue contains the unique identifier ("requesting node ID") for a node. The node at the top of the queue ("$1^{st}$ position") owns the distributed lock. The other members listed in the queue ($2^{nd}$ position, $3^{rd}$ position, $4^{th}$ position, etc) are waiting for the lock. The lock is transferred in FIFO order. Each queue can be replicated across the nodes of the coordination group via the algorithm described herein.

In one embodiment, the FTDLM leverages the capabilities of a virtual synchrony transport. In the case of process or network failure, the FTDLMs react appropriately to guarantee the same semantics as no-failure operation. The FTDLM can be configured to implement several performance optimizations. For instance, if a node "3" is at the top of the queue and the queue is of size 1 (i.e., only one element in the queue), an unlimited number of transactions are allowed to run concurrently or sequentially. If node "3" is at the top of the queue and the queue is of size greater than 1 (i.e., there are waiters in subsequent elements of the queue), a predefined number "n" of in-flight transactions are allowed to run and commit while the rest of the transactions are blocked. When these "n" transactions commit, the distributed lock is released.

This functionality achieves a number of desirable features, such as an increase in performance, by increasing the amount of work done for each distributed lock transfer from node to node. Likewise, fairness is increased by ensuring that a very aggressive member releases the lock so other nodes can use the lock. In one particular embodiment, the queues are stored and updated in transient memory, for performance reasons (e.g., to provide faster access). For reliability reasons, the top elements of the queue can be copied onto and read from a durable storage when faults are detected or are recovered from, as will be discussed in turn.

As will be understood in light of this disclosure, the FTDLM does not need to understand the types of resources that are being synchronized, nor what storage format is being used to persist data. The client of the FTDLM sees a self-contained distributed transaction and lock management component with a simple API and clear semantics that the client can use as appropriate. The FTDLM's behavior, when there are no faults, is typical for pessimistic lock managers that implement full 2-phase-locking. Fault tolerance in lock managers, however, is not trivial, so the FTDLM's behavior under fault is described in more detail.

In general, and with regard to process failure semantics of one embodiment of the FTDLM, if the application processes continue but an FTDLM state machine fails, the applications block waiting until the FTDLM state machine is terminated and restarted. After restart, the FTDLM state machines include logic that recovers their correct internal state, using a combination of persistent local storage and information from other operating members. After recovery, the FTDLM state machines resume correct operation. In some cases, in-flight transactions will be terminated and the applications are expected to retry the transactions. Thus, in this type of failure, the application generally sees a very slow response from Lock( ), a timeout, or is thrown an exception whereupon the application should retry his transaction. If both the applications and the FTDLM are abruptly terminated, then operation will resume when these components are both restarted.

With regard to network partition semantics of one embodiment of the FTDLM, when the network partitions and the local member (to the application) has quorum, applications that are executing transactions can continue to execute after a slight pause (e.g., a Lock( )call will block longer than usual) while the FTDLM reestablishes quorum and recovers from the fault. If the FTDLM state machines are unable to establish quorum, then all API's will throw an exception. This behavior persists until the local member is able to reestablish quorum (typically because the partition has been healed).

An FTDLM configured in accordance with an embodiment of the present invention has one or more of the following eight attributes.

Attribute #1: Separation of FTDLM from other elements of database system—In one embodiment, the FTDLM is separated from other elements of database systems (like Access Methods and the Log Manager) to increase generality of application, modularity of interfaces, and synergy between the FTDLM and local lock managers for high aggregate system performance and throughput.

Attribute #2: Use of totally ordered transport—An embodiment of the FTDLM uses a totally ordered transport to leverage high performance total ordering protocols that distribute message acknowledgement load between the various members for greater scalability and that implement pipelined message total ordering for greater throughput. Also, the FTDLM can exploit the multicast ability of the underlying hardware (e.g., Ethernet or other network features that enable multicast) for greater scalability and performance.

Figure 7:
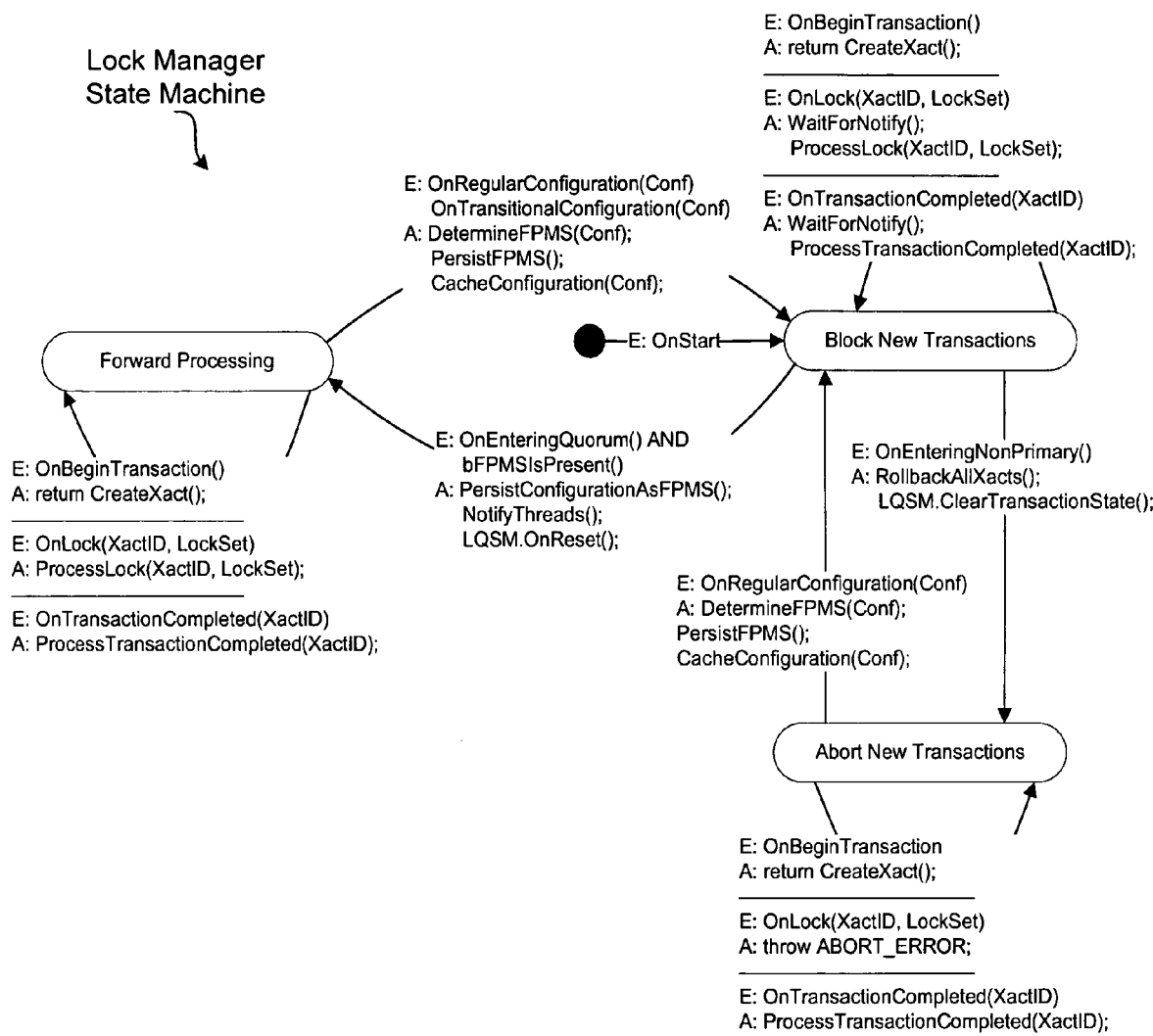
FIG. 7 illustrates a lock manager state machine of FIG. 4, configured in accordance with one embodiment of the present invention.

Attribute #3: Single distributed lock transfer—An embodiment of the FTDLM is configured so that, on each member, when the appropriate distributed lock is transferred to the local member, all transactions waiting for the resource are permitted to execute concurrently. This allows a single distributed lock transfer to enable many concurrent transactions to execute. These transactions, all executing on the same node, may potentially need to be serialized by a conventional local lock manager, as sometimes is done. This logic is encapsulated in the lock queue state machine (FIGS. 4 and 5) and lock manager state machine (FIGS. 4 and 7).

Figure 5:
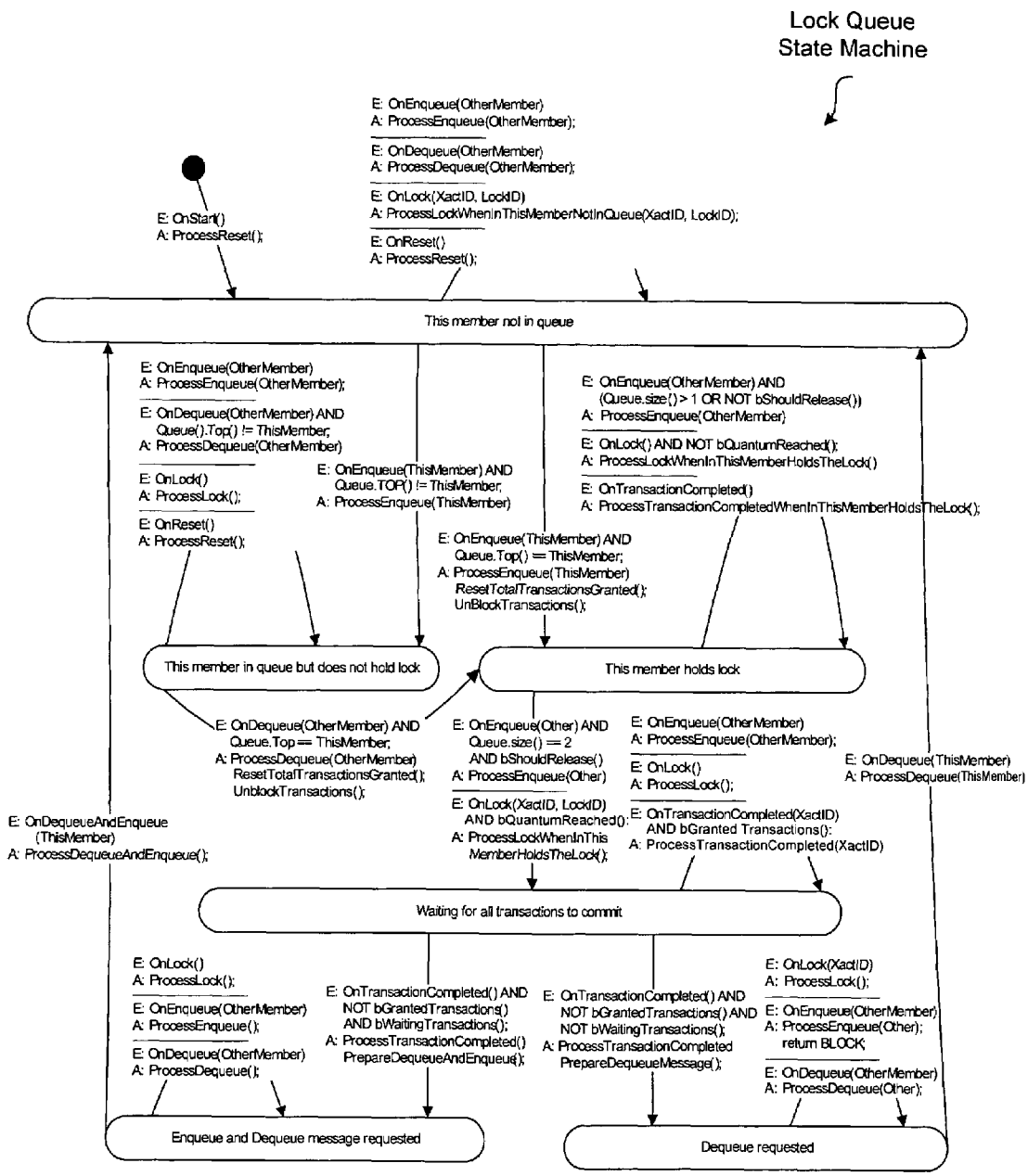
FIG. 5 illustrates a lock queue state machine of FIG. 4, configured in accordance with one embodiment of the present invention.

Attribute #4: Sticky locks—Assuming an application model where a member that has used a certain resource is more likely than other members to use that same resource again, one embodiment of the FTDLM implements "sticky locks." In more detail, after all transactions that are using a lock commit, the FTDLM keeps the ownership at that member until (or unless) another member requests the lock (or has requested it). This allows repeated acquisition of a lock by one member to execute rapidly and without network overhead. The FTDLM does this by decoupling a transaction's lock ownership and a member's lock ownership and optimizing for each differently. This logic is encapsulated in the lock queue state machine (FIGS. 4 and 5).

Attribute #5: Scheduling algorithm for distributed fairness—A scheduling algorithm can also be incorporated into an embodiment of the FTDLM to ensure that even when a node repeatedly and relentlessly requests a resource, exclusive access is properly distributed to other members (in FIFO order) for distributed fairness. The degree of fairness can be set as desired. This logic is encapsulated in the lock queue state machine (FIGS. 4 and 5).

Attribute #6: Use of Quantum for fairness—An embodiment of the FTDLM allows many transactions to run (a "quantum") before the lock is given up for fairness. In more detail, when multiple parties contend for the same lock, many conventional designs degrade in performance because of the constant lock transfers, and each lock transfer results in a small amount of computation. This logic is encapsulated in the lock queue state machine (FIGS. 4 and 5).

Attribute #7: Use of transient memory—The FTDLM accesses only transient memory during normal forward processing (e.g., acquisition and release of locks; begin and commit of transactions). Conventional fault tolerant systems use persistence to provide reliability in case of process failure. However, since access to persistent storage is significantly slower than access to transient memory, an embodiment of the FTDLM is designed to minimize access to persistent storage. This allows the FTDLM to operate with much higher performance than a typical persistent design. A description of how fault tolerance is maintained even without constant persistent storage access is provided with reference to the quorum calculation state machine (FIGS. 4 and 6) and the lock manager state machine (FIGS. 4 and 7).

Attribute #8: Using totally ordered broadcast to acquire/release multiple distributed locks across members—An embodiment of the FTDLM is capable of acquiring and releasing multiple distributed locks across members in one safe totally ordered broadcast by batching enqueues and dequeues of several locks in one message. This design is captured in the lock queue state machine (FIGS. 4 and 5), which exploits the separation in the algorithm of the movement of the ownership of distributed locks and the association of locks to transactions.

Fault Tolerance—Process and Network Failure

In addition to attributes enumerated above regarding performance, an embodiment of the FTDLM is configured with the ability to tolerate both process and network failures. Here, the term "toleration" refers both to the ability to continue processing in the face of failure as well as the ability to perform online recovery after failures are healed. The faults can be separated into two categories for conceptual clarity: failures due to single point process failures (e.g., process crashing, power failure, etc), and failures due to network failure where there is an inability of some members to communicate with others (e.g., network partitions).

Figure 6:
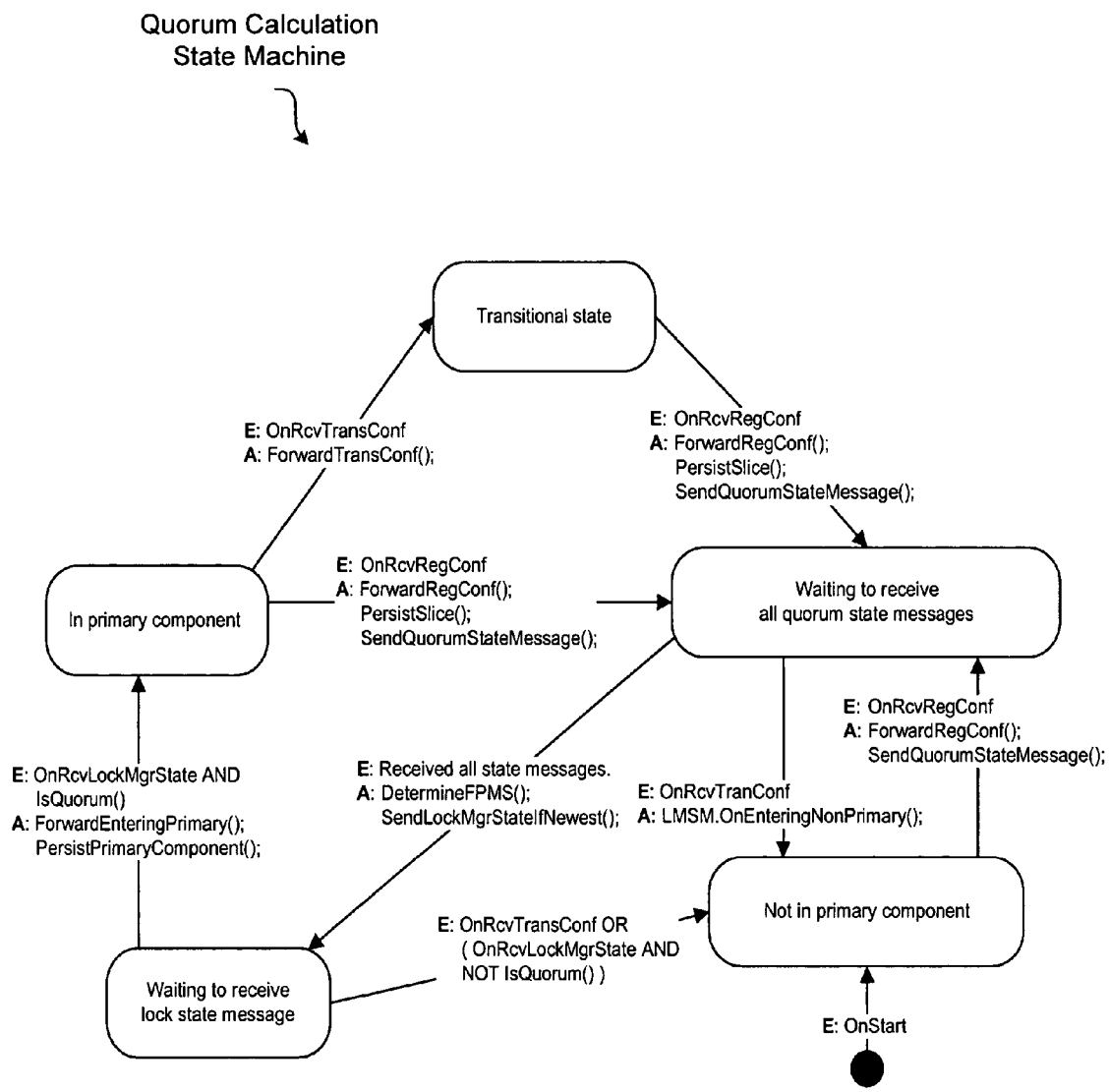
FIG. 6 illustrates a quorum calculation state machine of FIG. 4, configured in accordance with one embodiment of the present invention.

With regard to process failure fault tolerance, and in accordance with one embodiment, a quorum must be established before Lock( ) or TransactionCompleted( ) are permitted to succeed. Example quorum logic is encapsulated in the quorum calculation state machine (FIGS. 4 and 6). In one particular case, quorum is established if a majority of the previous quorum is detected in the current set of reachable members. This allows greater ease of quorum establishment. The initial "previous quorum" is the complete membership. In cases where a failed member recovers and reattaches to an online operational group, logic in the lock manager state machine (FIGS. 4 and 7) brings the recovering member's data structure up to date by having an up-to-date member send the recovering member the necessary state information. This recovery algorithm is efficient and exploits properties of the Extended Virtual Synchrony Transport. To prevent the situation of forgotten lock queues in the relatively rare case where all members simultaneously crash, the lock manager state machine (FIGS. 4 and 7) can be configured with FPMS (forward processing member set) logic, whereby the set of reachable members is persisted by each member on enter and exit to and from the quorum state.

With regard to network partition fault tolerance, and in accordance with one embodiment, when a group (termed "configuration") of members is divided into smaller configurations, quorum can again be used to ensure only one configuration has the ability to make updates. This ensures the mutual exclusion guarantee even when some members are unable to communicate to other members. To ensure that the lock state is not forgotten during a combination of process failure and network partition failure, an embodiment of the FTDLM includes slice persistence logic, implemented in the quorum calculation state machine (FIGS. 4 and 6), whereby the owners of the lock queues are persisted at certain points during failure and recovery.

Lock Manager Control

FIG. 4 is a block diagram of a lock manager control module of FIG. 3, configured in accordance with one embodiment of the present invention. As can be seen, the FTDLM implements lock manager control functionality using three interacting state machines (a quorum calculation state machine, a lock manager state machine, and a lock queue state machine), durable storage, and a total order transport module (e.g., Extended Virtual Synchrony Transport or other suitable total order transport). The data flow of the lock manager control module is also shown. Variations will be apparent in light of this disclosure. For example, the Extended Virtual Synchrony Transport can be implemented outside the lock manager control module (e.g., as shown in FIG. 2), as can be the durable storage.

Each instance of the FTDLM has one instance of the lock manager state machine, one instance of the Extended Virtual Synchrony Transport, one instance of the quorum calculation state machine, and n instances of the lock queue state machine (one for each of n resources that require distributed lock synchronization). These state machines communicate to each other with the interfaces specified in the data flow shown FIG. 4. The aggregate behavior of these state machines implements the functionality claimed in this patent.

The dataflow diagram also depicted in FIG. 4 demonstrates the relationships between the various state machines components. Components are denoted by boxes and data flow denoted by arrows. The direction of the arrows indicate flow of data, not flow of control. The arrow's labels show the types of messages that flow between the components. Although the diagram depicts only one application and one lock queue state machine, there can be many instances of the application and many instances of the lock queue state machine running concurrently.

The Extended Virtual Synchrony Transport (which can also be referred to as a total order transport, or simply Transport herein) detects the set of currently reachable members with well defined ordering guarantees (e.g., as described in the previously incorporated "From Total Order to Database Replication", by Yair Amir and Ciprian Tutu, John Hopkins University, Department of Computer Science), and informs the quorum calculation state machine via Regular Configuration and Transitional Configuration notifications. In addition, the Transport is used to send and to receive messages with the "safe" totally ordered delivery guarantee from and to the various state machines as depicted. The Transport informs these state machines by various OnRcv*notifications as shown in FIG. 4.

This embodiment of the FTDLM exploits well-known semantics of Extended Virtual Synchrony (EVS), as detailed in the previously incorporated, "Extended Virtual Synchrony", L. E. Moser, Y. Amir, P. M. Melliar-Smith, and D. A. Agarwal, University of California at Santa Barbara, Department of Electrical and Computer Engineering. For convenience, various semantic requirements the FTDLM assumes from the Transport are described here: The Transport provides the application notification of configuration changes. A configuration is an ordered list of processes currently accessible to the local process, agreed upon by a fault-tolerant consensus algorithm. There are two types of configurations: regular and transitional. All messages are delivered within either a transitional or a regular configuration. If a message was delivered in a regular configuration, then that process knows it was delivered to all other members in that configuration as well, except if the remote member crashes. These messages are totally ordered (with no gaps) with respect to the regular configuration. Messages not meeting this requirement (in failure cases) are delivered in a transitional configuration or not delivered. Processes that receive 2 regular configurations and are in both receive the same set of messages (sometimes referred to as failure atomicity).

The quorum calculation state machine (QCSM) takes input from the Transport via the two types of configuration messages and regular (totally ordered) messages. The configuration messages, generated by the Transport, inform the QCSM about failures or new arrivals of nodes. The QCSM uses this information combined with the locally persisted membership to implement the persistent quorum calculation algorithm, guaranteeing mutual exclusion even in the face of network partitions and process failures. Also, when the QCSM determines that fault recovery is required (e.g., a node that is part of the membership previously failed and has now recovered and attached to the network), the QCSM uses SendLockMgrState to use the Transport to synchronize state information with other operating instances of the FTDLM. The QCSM is discussed in more detail with reference to FIG. 6.

The lock manager state machine (LMSM) takes input from three sources: Application, QCSM, and the Transport. The Application notifies the LMSM of each transaction begin and transaction complete (e.g., commit or rollback). The Application uses the LMSM to acquire distributed locks. The LMSM blocks the lock request until the distributed lock is obtained. There can be 0 . . . n instances of Application. The QCSM informs the LMSM when it achieves quorum via the OnEnteringPrimary notification so that the LMSM can ensure that Lock( ) is operational when it is known that this instance belongs to a group that has a quorum. The QCSM also informs the LMSM via OnEnteringNonPrimary when, due to either process or network failures, the QCSM is unable to achieve quorum. The Transport informs the LMSM when it detects changes in the set of reachable members via the OnRcvRegConf and OnRcvTransConf notifications so that the LMSM can ensure that Lock( ) becomes non-operational (e.g., either blocking of throws an exception) when it is known that quorum is not currently established due to a fault or a recovering member. When the LMSM has determined from its three inputs that lock activity can proceed, it notifies the appropriate lock queue state machine to process the Lock or TransactionComplete request. The LMSM is discussed in more detail with reference to FIG. 7.

The lock queue state machine (LQSM) encapsulates the logic necessary for the maintenance (e.g., synchronization) of the distributed queues as well as waking up blocked threads. It takes input from the LMSM and the Transport and outputs to the Transport. On receiving an OnLock notification from the LMSM, the LQSM determines whether the Lock call can return immediately (e.g., because the lock is already owned by the local member). If not, the LQSM sends appropriate messages to the Transport (e.g., via the SendEnqueue, and SendEnqueueAndDequeue messages) to initiate the distributed transfer of the ownership of the lock. On receiving an OnCommit notification from the LMSM, the LQSM determines if it is necessary to release any locks to other members. If so, it sends a dequeue message over the Transport (e.g., via SendDequeue). On receiving a dequeue message from the Transport (e.g., via the OnRcvDequeue notification), the LQSM determines if this enables any waiting transactions to proceed (e.g., because the dequeue of a remote member places the local member at the top of the queue) and notifies the waiting transactions as appropriate. The LQSM is discussed in more detail with reference to FIG. 5.

In this embodiment shown in FIG. 4, the durable storage is used to store the top elements of the lock queues when faults are detected or are recovered from, as will be apparent in light of this disclosure. The durable storage can be, for example, ROM, flash, or other non-volatile memory.

Lock Queue State Machine (LQSM)

FIG. 5 illustrates a lock queue state machine of FIG. 4, configured in accordance with one embodiment of the present invention. The LQSM can be implemented, for example, with software (e.g., C++), hardware (e.g., gate-level logic), or a combination of hardware and software (e.g., microcontroller with a number of embedded routines for carrying out functionality associated with the LQSM. The LQSM of this embodiment implements a single resource mutual exclusion algorithm exploiting the Extended Virtual Synchrony Transport for performance and implementing fault tolerance.

In more detail, the LQSM of this embodiment modifies the Leslie Lamport Bakery Algorithm (see pages 34-35 of Appendix A of the previously incorporated U.S. Provisional Application No. 60/671,373 for a concise and practical realization of Lamport's original algorithm) to provide significantly improved performance by exploiting the Extended Virtual Synchrony Transport. A realization of this algorithm for replicating state machines across distributed nodes leveraging Extended Virtual Synchrony is provided in the previously incorporated U.S. Provisional Application No. 60/671,373 (on page 37 of Appendix A therein), and reproduced here as well (and is referred to herein as Algorithm 1):

```
//////////////////////////////////////////////////////////
// Replicated State Machine.
// Exploiting the power of safe totally ordered broadcast primitive (safe:
// messages are delivered only when all receivers have ack'ed).
// User makes changes to the state machine and waits for callback when
// the. change is done (and replicated on all machines).
//////////////////////////////////////////////////////////
// Threadsafe, distributed replicated state machine.
// Methods have no error return codes for reliability.
class ReplicatedStateMachine
{
   // This statemachine class stores state and has a method to execute
   // changes, ChangeState(Change ch).
   // It needn't be threadsafe for the correctness of this RSM.
   StateMachine m_state;
   // Request from the user to change state.
   ChangeStateRequest(Change ch)
   {
      // Use a lock class on the stack to handle lock exit on destruction
      //in case of exception.
      LocalLock lck(m_lock);
      m_lock.Lock( );
      // Broadcast change request to everyone, including yourself.
      SafeTotallyOrderedBroadcast(ch, g_LocalProcessID);
   };
   // Received a state change request from the network.
   OnReceiveChange(Change ch, ProcessID idSourceProcess, LTS
   ltsSource)
   {
      // Use a lock class on the stack to handle lock exit on
      //destruction in case of exception.
      LocalLock lck(m_lock);
      m_lock.Lock( );
      m_state.ChangeState(ch);
      if(idSourceProcess == g_localProcessID)
      {
         TellUserAboutStateChangeCompletion( );
      }
      else
      {
         return;
      }
   }
};
```

Algorithm 1 is used to replicate a state machine that implements mutual exclusion, thereby producing a distributed mutual exclusion algorithm (that uses the Extended Virtual Synchrony Transport). A realization of this distributed mutual exclusion algorithm that uses the Extended Virtual Synchrony Transport is provided in the previously incorporated U.S. Provisional Application No. 60/671,373 (on page 39 of Appendix A therein), and reproduced here as well (and is referred to herein as Algorithm 2):

```
////////////////////////////////////////////////////////////////
// The StateMachine here is a FIFO queue of process indices. The queue is
// replicated onto all processes in the coordinating group. On Lock( ),
// the request is inserted into the queue,
// waits until the request is replicated, then returns. Note here what is done
// by the RSM code, and what is done in the lock manager code.
// Each resource needs an instance of this class.
// This implementation is threadsafe.
class SingleResourceLock
{
  // This queue is derived from the base class ReplicatedStateMachine
  above.
  // The base RSM class will replicate this queue to all members of
  // the coordinating group and ensure the same sequence of operations
  on the queue. QueueOfProcesses m__rsm;
  Lock( )
  {
    // Use a lock class on the stack to handle lock exit on
    //destruction in case of exception.
    LocalLock lck(m__lock);
    m__lock.Lock( );
    m__rsm.ChangeStateRequest(RLMChange(rlm__ADD,
    g__processIDLocal);
    // Waits on an event to be signalled when this process
    // ID reaches the top of the queue.
    WaitForThisRequestToReachFrontOfQueue( );
  }
  Unlock( )
  {
    LocalLock lck(m__lock);
    m__lock.Lock( );
    m__rsm.ChangeStateRequest(RLMChange(rlm__REMOVE,
    g__processIDLocal);
  }
  // Called by m__rsm on every state change.
  OnStateChange(Change ch)
  {
    LocalLock lck(m__lock);
    m__lock.Lock( );
    if(g__processIdLocal == m__rsm.TopItem( ).ProcessID( ))
    {
      SignalLocalWaiter( );
    }
  }
};
```

In one particular embodiment of the FTDLM, Algorithm 2 has the following functionality: (1) safety and liveness (e.g., "does nothing wrong" and "does something right eventually") in guaranteeing mutual exclusion for a single resource when there are no faults; (2) FIFO granting of ownership to requesters for exclusive access to a single resource (e.g., guarantees some level of fairness); and (3) requires no leader/master node (making it suitable for extending the algorithm for fault tolerant clusters).

Algorithm 2 can be optimized for efficient granting of sequential lock requests by the same node. In more detail, and with reference to the lock implementation of Algorithm 2, every acquire or release of the lock requires 1 broadcast and N broadcast acknowledgements. This is the case even if the same process requests the same lock over and over without anyone else contending on it. In some cases, it may be desirable to optimize away the network traffic and resulting latency costs of repeated acquisition of the same resource by the same process. For example, in Algorithm 2, every release of a resource involves updating the shared FIFO queue. Updating the FIFO queue involves sending messages to the other copies of the FIFO queue, which is traffic that can be reduced. Thus, in one embodiment, a local flag (e.g., IsReleased flag) is added to the class that is not replicated (and therefore should not be in the state machine class). On release, a determination as to whether there is a process waiting in the FIFO queue for the resource. If yes, the process is given the lock by updating the shared FIFO queue. If not, the FIFO queue is not updated. Rather, the local flag is set or otherwise marked as TRUE. Now, the next Lock( ) from the local process can return immediately (without updating the FIFO queue) simply by checking this local flag. If a request from another process for this resource is received in the OnReceive( ) callback, the update to the FIFO queue is performed. Then, if the local flag is TRUE, the resource is given up by finally updating the FIFO queue.

A realization of this optimized single resource lock algorithm is provided in the previously incorporated U.S. Provisional Application No. 60/671,373 (on page 40 of Appendix A therein), and reproduced here as well (and is referred to herein as Algorithm 3):

```
class OptimizedSingleResourceLock
{
  QueueOfProcesses m__rsm;
  BOOL m__bIsReleasedButStillInQueue;
  TokenManager( ) : m__bIsReleasedButStillInQueue(FALSE) { }
  Lock( )
  {
    LocalLock lck(m__lock);
    m__lock.Lock( );
    if( IsThisProcessAlreadyInFrontOfQueue( ) )
      return;
    else
    {
      m__bIsReleasedButStillInQueue = FALSE;
      m__rsm.ChangeStateRequest(RLMChange(rlm__ADD,
      g__processIDLocal);
      WaitForThisRequestToReachFrontOfQueue( );
    }
  }
  Unlock( )
  {
    LocalLock lck(m__lock);
    m__lock.Lock( );
    m__bIsReleasedButStillInQueue = TRUE;
  }
  // Called by m__rsm on every state change.
  OnStateChange(Change ch)
  {
    LocalLock lck(m__lock);
    m__lock.Lock( );
    if(g__processIdLocal == m__rsm.TopItem( ).ProcessID( ))
    {
      SignalLocalWaiter( );
    }
    else if(m__bIsReleasedButStillInQueue)
    {
      // Time to give up the token.
      m__rsm.ChangeStateRequest(RLMChange(rlm__REMOVE,
      g__processIDLocal);
    }
    // else it's someone else's lock request and grant and we're keeping
    // it just for fault tolerance availability.
  }
};
```

The LQSM of FIG. 5 has six inputs: OnEnqueue, OnDequeue, OnEnqueueAndDequeue, OnLock, OnReset, and OnTransactionComplete. Semantics of each event are as follows:

OnEnqueue: Either this member or a remote member sent an Enqueue message (because the member requested a lock) previously and the Transport is now delivering the message to the LQSM;

OnDequeue: Either this member or a remote member sent a Dequeue message (the member which previously owned the lock no longer needs it and is releasing the lock to allow the next member on the queue to use it) previously and the Transport is now delivering the message to the LQSM;

OnEnqueueAndDequeue: Either this member or a remote member sent a EnqueueAndDequeue message (that member still requires the lock but is releasing the lock temporarily to allow for fairness) previously and the Transport is now delivering the message to the LQSM;

OnLock: The LMSM informs the LQSM about the application's request for a lock via this event;

OnReset: The LMSM informs the LQSM that there was a previous fault and that the system has recovered from the fault via this message; and OnTransactionComplete: The LMSM informs the LQSM about the application's completion of a transaction via this event.

With reference to FIG. 5 (as well as FIGS. 6 and 7), note that ovals represent states of the state machine. Each arrow has an event and an action labeled with "E:" or "A:" respectively. Events trigger the transition as well as the action in the arrow. Events that are not explicitly depicted in the diagram of this example embodiment are either not possible or are ignored (e.g., neither causes state transitions to occur nor executes any actions).

As can be seen in FIG. 5, the LQSM algorithm implements several performance optimizations. If a node "A" is at the top of the queue and the queue is of size 1, an unlimited number of transactions are allowed to run concurrently or sequentially. If "A" is at the top of the queue and the queue is of size greater than 1, a predefined number "n" of in-flight transactions are allowed to run and commit while rest of the transactions are blocked. When these "n" transactions commit, the distributed lock is released. This is done to achieve two features: (1) increase performance by increasing the amount of work done for each distributed lock transfer from node to node, and (2) increasing fairness by ensuring that a very aggressive member releases the lock so other nodes can use the lock. For performance reasons, the queues are stored/updated in transient memory, in accordance with one embodiment of the present invention (note, however, that persistent data structures could be used, assuming the associated latency was tolerable). For reliability reasons, the top elements of the queue are copied onto and read from durable storage when faults are detected or are recovered from.

Transient data structures of this of the embodiment of the LQSM shown in FIG. 5 are as follows.

GrantedTransactions—The set of transactions that have been granted (currently hold) this lock. These transactions are either executing or waiting for other locks. Read from by: bGrantedTransactions( ), bQuantumTransactionsRunning( ). Written to by: ClearTransactionState( ), ProcessTransactionCompleted( ), UnblockTransaction( ), UpdateTransactionLists(true).

LockQueueQuantumSize—The number of transactions that make up a quantum at this member. Read only. Read from by: bQuantumReached( ), bQuantumTransactionsRunning( ).

Queue—A queue that holds members waiting for the lock. The member at the head of this queue holds the lock. Read from by: bMemberWaiting( ), OnReset( ). Written to by: OnReset, ProcessDequeue( ), ProcessEnqueue( ).

TotalTransactionsGrantedForThisQuantum—The number of transactions that have executed during this quantum. If there is a waiter, and this quantum is reached, then the member will release the lock. Read from by: bQuantumReached( ). Written to by: ResetTotalTransactionsGrantedForThisQuantum( ), UnblockTransaction( ), UpdateTransactionLists(true).

Waiting-Transactions—The set of transactions waiting for this lock. Read from by: UnblockTransactions( ), bWaitingTransactions( ). Written to by: ClearTransactionState( ), UnblockTransaction( ), UpdateTransactionLists(false).

Function definitions of the embodiment of the LQSM shown in FIG. 5 are as follows.

bCanUnblockTransaction( )—If not bQuantumTransactionsRunning( ) and (not bMemberWaiting( ) or not bQuantumReached( )), then Return true. Else, Return false.

ClearTransactionState( )—Clear the data structures holding the sets of waiting and granted transactions.

Dispatch( )—Send the set of enqueue and dequeue messages that are ready to be dispatched.

bGrantedTransactions( )—Are there any granted transactions? If so, then Return GrantedTransactions.size( )>0.

bMemberWaiting( )—If the size of the queue is greater than one, then there is a member waiting. Return Queue.size( )>1.

OnReset(Configuration)—The delivered configuration has entered 'Forward Process' meaning that the LMSM has 'recovered' from a configuration change. However, this new configuration may not include all the members that were present in the prior configuration; remove any members in the lock queue that are not present in the new configuration; exclude head locks from this process, the locks held by missing members must be respected. New lock queues may have been installed; LQSM needs to reset. Determine the state that the reset should start in (call DetermineState( )). Then, given a start state, process the reset (call ProcessReset(State)).

DetermineState( )—If this member is not in the queue, set the state to 'This member not in queue'. Otherwise set the state to 'This member in queue but does not hold lock'.

OnLock(XactID, LockSet)—Iterate over the set of locks required by the transaction. For each lock in the lock set, call OnLock(XactID, LockID) (this may cause enqueue messages to be prepared), and call Dispatch( ) (this will cause any prepared enqueue and dequeue messages to be sent).

OnTransactionCompleted(XactID, LockSet)—Iterate over the set of locks that the transaction held. For each lock in the lock set, call OnTransactionCompleted(XactID, LockID) (this may cause enqueue and dequeue messages to be prepared), and call Dispatch( ) (this will cause any prepared messages to be sent).

PrepareDequeueMessage(ThisMember, LockID)—Instantiate a dequeue message, including the lock being released (this lock) and the member requesting that the lock be released (this member). Add this dequeue message to the set of messages to be dispatched.

PrepareDequeueAndEnqueueMessage(ThisMember, LockID)—Instantiate a dequeue and enqueue message, including the lock being released and re-requested (this lock) and the member requesting the dequeue and enqueue (this member). Add this dequeue and enqueue message to the set of messages to be dispatched.

PrepareEnqueueMessage(ThisMember, LockID)—Instantiate an enqueue message, including the lock being requested (this lock) and the member requesting the enqueue (this member). Add this enqueue message to the set of messages to be dispatched.

ProcessDequeue(Member)—Remove the member from the head of the queue.

ProcessEnqueue(Member)—Add the member to the tail of the queue.

ProcessLock(XactID, LockID)—Call UpdateTransactionLists(false). Return false to the lock manager state machine, which will block the invoking thread.

ProcessLockWhenInThisMemberHoldsTheLock(XactID, LockID)—If bCanUnblockTransaction( ), then call UpdateTransactionLists(true) and Return true. Else, call UpdateTransactionLists(false), and Return false to the lock manager state machine, which will block the invoking thread.

ProcessReset(State) is as follows:

```
If State = = 'This member not in queue'
    If bWaitingTransactions( )
        Send an enqueue message (not a batch message)
        Return
Else if the state is 'This member in queue but does not hold lock'
    If Queue.Top = = ThisMember
        Set state to 'This Member Holds Lock'
    Else
        Return
Else if the state is 'This Member Holds the Lock'
    If bShouldRelease( )
        Set state to 'Waiting for transactions to complete'
    Else
        Return
Else if the state is 'Waiting for transactions to complete'
    If NOT bGrantedTransactions( ) AND bWaitingTransactions
        Set state to 'Enqueue and Dequeue message requested'
        Send an enqueue and dequeue message (not a batch message)
    If NOT bGrantedTransactions( ) AND NOT bWaitingTransactions
        Set state to 'Dequeue message requested'
        Send a dequeue message (not a batch message)
```

ProcessLockWhenInThisMemberNotInQueue(XactID, LockID)—Call PrepareEnqueue( ) to create an enqueue message for this lock and add it to the set of messages to be dispatched. Call UpdateTransactionLists(false). Return false to the lock manager state machine, which will block the invoking thread.

ProcessTransactionCompleted-WhenInThisMemberHoldsTheLock(XactID)—If a transaction completes, and there is not a member waiting, then another transaction can take the place of the completed transaction in the quantum. ProcessTransactionCompleted(XactID). If not bMemberWaiting( ) and bWaitingTransactions( ), then UnblockTransaction( ).

ProcessTransactionCompleted(XactID)—Remove the transaction from the set of granted transactions.

bQuantumReached( )—True if this member has granted the lock to LockQueueQuantumSize transactions. Return TotalTransactionsGrantedForThisQuantum>=LockQueueQuantumSize.

bQuantumTransactionsRunning( )—True if there are LockQueueQuantumSize transactions currently executing. If GrantedTransactions.size( )>=LockQueueQuantumSize, then Return true. Else, Return false.

ResetTotalTransactionsGranted( )—Set TotalTransactionsGrantedForThisQuantum to zero.

bShouldRelease( )—Given a waiting member and no running transactions, this member should release if there are no waiting transactions or it has started its share (quantum) of transactions. If not bWaitingTransactions( ) or bQuantumReached( ), then Return true. Else, Return false.

UnblockTransaction( )—Remove the next transaction from the set of waiting transactions. Add that transaction to the set of granted transactions. Increment TotalTransactionsGrantedForThisQuantum. Unblock the transaction.

UnblockTransactions( )—Iterate over the set of waiting transactions. While (bCanUnblockTransaction( )) is true, call UnblockTransaction( ).

UpdateTransactionLists(transactionIsGranted)—If transactionIsGranted, add the transaction to the set of granted transactions, and increment TotalTransactionsGrantedForThisQuantum. If not transactionIsGranted, then add the transaction to the set of waiting transactions.

bWaitingTransactions( )—True if there are waiting transactions; that is if the set of waiting transactions is not empty.

Quorum Calculation State Machine (QCSM)

FIG. 6 illustrates a quorum calculation state machine of FIG. 4, configured in accordance with one embodiment of the present invention. The QCSM can be implemented, for example, with software (e.g., C++), hardware (e.g., gate-level logic), or a combination of hardware and software (e.g., microcontroller with a number of embedded routines for carrying out functionality associated with the QCSM. The QCSM of this embodiment guarantees mutual exclusion in the face of network partitions and process failures.

In more detail, whenever a network partitions, the Extended Virtual Synchrony Transport (or other suitable total order transport) at each member is able to determine the set of remote members that that particular member can reach. This set is called the current configuration. The Transport provides this information to the QCSM via regular/transitional configuration messages. Given the current configuration and the total membership, each member is able to compute if the current configuration constitutes a majority of the total membership. If so, the current configuration is said to have a quorum. A configuration that has quorum is called the primary component (per standard nomenclature). Other configurations are called secondary components. Formally (and provably), given any partitioning of a membership, there can at most be one primary component.

The embodiment of the QCSM shown in FIG. 6 employs a modified quorum for greater fault tolerance in the following ways. Every time the QCSM determines that the local member is part of a primary component (transitions to In primary component state), the QCSM persists the primary component (using the action PersistPrimaryComponent). The quorum condition is reached when the current configuration is a majority of the last primary component (as opposed to when the current configuration is a majority of the total membership). This condition makes it easier to reach quorum and continues to maintain that there only be one primary component in any partitioning of the membership.

The QCSM can be understood as logic trying to get the current member, which starts in the Not in primary component state, into the primary component by means of broadcasting a variety of totally ordered safe messages and transitioning through a variety of states, as shown in FIG. 6. The goal is achieved when the QCSM enters the In primary component state.

The FTDLM uses the QCSM to compute if the current member belongs to the primary component. The lock manager state machine (LMSM) is notified of this QCSM transition via the ForwardEnteringPrimary notification. The LMSM ensures that only if the current member is in the primary component is the member allowed to succeed in a Lock( ) call. This, combined with the condition that there can only be one primary component at a time, ensures that no two members can be granted ownership of the same lock even in the presence of network partitions.

This lock algorithm, supplemented with persistence of certain data structures at certain points as will be apparent in light of this disclosure, is also sufficient for tolerating process failures. Each member has a persistent record of its member name (e.g., an invariant unique identifier), and the membership (e.g., an invariant list of the member names).

Recovery—When a member that had previously failed reconnects to the group, it is necessary to bring the recovering member's FTDLM's internal state up to date. The QCSM implements this logic. In more detail, such a change in topology is detected by the Transport and reported to the QCSM via a configuration message (e.g., OnRcvRegConf or OnRcvTransConf). This will eventually result in a call to SendQuorumState. This information is sufficient for each member to determine if it has the authoritative (e.g., most up-to-date) data (e.g., by checking if it has the largest primary component number after all quorum state messages have been received). If so, the member broadcasts it's lock state (e.g., lock queues) using the SendLockMgrState.

Tolerating simultaneous all member failure—There are two failure scenarios that may require additional logic. Both scenarios involve the simultaneous failure of all processes in a primary component. For performance reasons, and in one particular embodiment, the replicated lock queues are only updated in transient memory during fault-free forward processing. If the lock queues are updated for every lock transfer, than the logic described in this section is superfluous. However, it may be desirable to have both the performance of operating only in transient processing during fault-free processing with the ability to tolerate faults; thus the logic described here.

If one member fails and other members survive, the recovered member can acquire the more recent queues from the surviving members via the state exchange protocol (as shown in FIG. 6, the states beginning with Waiting to receive all quorum messages). When all members simultaneously fail, there are no surviving members from which to acquire the authoritative queues. This type of failure can be broadly divided into two categories because they require different solutions: the all member failure scenario, and the all member failure with partitions scenario.

In an all member failure scenario, the members of the primary component were processing transactions and exchanging lock ownership among the members when all of the members failed. No members were partitioned from the primary component. Members in the primary component may be using resources (e.g., writing to a shared piece of data) because locks have been granted. Furthermore, the state of the lock queues at the time of failure is not known.

One implementation of recovery from this type of failure depends on the following observation: In order to recover correctly, the QCSM merely needs to ensure that all members that were present at the time of failure must be present during recovery (e.g., formation of a primary component). In particular, it is not necessary to install (or recover) the lock queues that were present at the time of failure. This insight allows derivation of an algorithm whereby lock queues need not be persistently updated during fault-free processing.

When the members have recovered, they can start with empty lock queues. It is possible that activity that occurred prior to the catastrophic failure was not completed. On recovery, if all members recover simultaneously, the client of this FTDLM implements an algorithm that looks at the state of the recovering members and synchronizes the state so that state is consistent. Because all members that were working previously are recovering together, all information necessary for this synchronization is available. Were there to be a member in the previous primary component that does not recover together with this all-member-failure case, then safe recovery is not guaranteed. For example, if the missing member held locks and committed data updates, then the other members, on recovery, should not be able to get those locks and commit changes without first getting all prior committed changes.

To guarantee that all members recover together, the QCSM persists the Forward Processing Member Set (FPMS) at critical times and checks to make sure that at least this set of members are present when recovering before reporting that it has achieved quorum (e.g., the local member has joined a primary component). The QCSM of this embodiment deals with the FPMS at three distinct points in time: (1) when a primary component is formed, (2) when a primary component is ended by a configuration change, and (3) when quorum state is exchanged.

FPMS maintenance activity when a primary is formed: When a new primary component is formed (entering the In primary component state), the set of members that make up the primary component also define the FPMS. The FPMS is persisted by the PersistFPMS action in the lock manager state machine (which is described in more detail with reference to FIG. 7). For a working example, assume a primary component formed with members A, B, and C. For the duration of that primary component, while A, B, and C forward process, the FPMS consists of A, B, and C. The lifetime of each primary component is ended by a configuration change message received from the Transport via OnRcvRegConf or OnRcvTransConf. A configuration change message might remove or add members from the previous configuration. In the working example above, a configuration change message might, for instance, remove member B if it has failed or been partitioned. It might also add another member, such as D, that has recovered or remerged.

FPMS maintenance activity when a configuration change is received: On receipt of a configuration change message, missing members are removed from the FPMS. The FPMS is then again persisted using the PersistFPMS action. In the working example above, if a new configuration of A, C, D is delivered, then member B is removed from the FPMS. The new FPMS of A, C is again persisted. Member D is not added at this point.

FPMS maintenance activity when during QSM state exchange: Lastly, the QCSM deals with the FPMS when quorum state messages are exchanged. Each QCSM instance in the configuration includes the FPMS as part of its quorum state in the SendQuorumState action. The FPMS for the new configuration is then determined whereby it is the union of the FPMS sent by each member in the new configuration. This is shown as the DetermineFPMS action in the embodiment of the QCSM shown in FIG. 6.

In the working example above, both A and C send an FPMS of A, C. D, which has joined the configuration, might send an FPMS of D, E. This might happen if D and E were partitioned together, both subsequently failed, and only D recovered. In this case then, the FPMS for the new configuration will be A, C, D, E. This new FPMS needs to be persisted only if it is present and forward processing is subsequently enabled (via formation of the primary). When the new primary component of A, C, D forms, the FPMS of A, C, D, E will need to be present for forward processing to be enabled. As this won't be the case, forward processing is not allowed to occur until member E recovers and remerges with the primary component (guaranteeing correctness by satisfying the invariant above).

Tolerating partitioning failures that happen concurrently with all member failures: Additional complications arise when a primary component partitions and all members in one (or more) of the resulting components fail, recover, then remerge. Consider a primary component of members A, B, and C. In this working example, suppose that member B (which holds some locks) is partitioned from A, C. If there are no process failures, there is no risk of incorrectness: A and C maintain their transient lock state and know that B holds locks. A and C will not be able to change the data represented by the locks that B holds. When B remerges, it may hold changes that were made to its persistent memory before the partition but were not replicated to the A and C before the partition occurred. When B remerges, it can safely send these changes to A and C. A and C can not hold conflicting changes because they have respected the locks held by B.

Further consider the primary component A, B and C again, and have B partitioning away from {A,C} as before into {A,C} and {B}. Now suppose that A and C both fail. Transient state is lost and A and C will no longer remember what locks B holds. The FPMS is {A, C} at members A and C. Given only the FPMS information, the algorithm will allow A and C to recover together, enter the primary component, and violate the mutual exclusion guarantee because A and C may acquire locks that B still holds.

This discussion demonstrates that the FPMS facility above is not sufficient when there are partitions and all member failures. Thus, the embodiment of the QCSM shown in FIG. 6 includes slice persistence, to deal with this scenario. By introducing this facility (slice persistence), the FTDLM is able to maintain mutual exclusion in the face of any combination of process or network failures.

The slice: The slice is the set of ordered pairs of (lock name, lock owner) where lock owner is the top element of each of the queues for each of the locks identified by lock name. When a primary component is ended by a configuration change message, the slice is persisted. In the QCSM embodiment shown in FIG. 6, this is represented by the PersistSlice action.

The slice is always persisted atomically with the version of the primary component. Therefore, each member holds two instances of the lock queue state, both of which are versioned: (1) the lock state held in transient memory (referred to as the 'transient lock state'), and (2) the persisted lock state (referred to as the slice). For performance reasons, the slice is sometimes out of date with respect to the latest transient lock state.

The following algorithm's purpose can be used to ensure that these inconsistencies do not produce incorrect semantics: (1) The slice is persisted when a primary component is ended by a configuration change. (2) The slice is also included in the exchange of lock state previously described. When all quorum state messages are received, one member (determined to be the most up-to-date) sends the most recent version if its lock state via SendLockMgrStateIfNewest( ). The lock state sent could be either transient or persistent lock state, whichever has the greater index. In the normal course of processing, transient lock state would be more up to date. However, if a process is recovering from failure, it will have no transient lock state and so will send its slice instead. (3) Each member delivers the lock state message with OnRcvLockMgrState. If the received lock state is more up to date than the current transient lock state, then the remote lock state overwrites the local transient lock state. If the delivered lock state is more up to date than the locally persisted slice, then the delivered lock state and its index will be installed as a new version of the slice.

Continuing with the previous working example, recall that members A, B, and C form a primary component. B partitions from {A,C} while B holds locks. At this point, A and C will persist their lock state as the slice. The persisted lock state will include the locks held by B. A and C subsequently fail together, losing their transient lock state. On recovery, however, both A and C will install the persisted slice as their transient lock state, thereby restoring the locks held by B. When B recovers, it will be able to remerge safely with A and C.

Versioning of Lock State: The exchange of lock state among members is augmented by a version number maintained at each member. The number is incremented when the QCSM at that member enters primary and is persisted at various times as described in the embodiment of the QCSM shown in FIG. 6.

Fault recovery and lock state exchange: For efficiency, a minimum of lock state information is transferred among the members during recovery. The version number is leveraged to determine the most up-to-date member and that member broadcasts its state. An insight enabling this optimization (exploiting the semantics of Extended Virtual Synchrony) is that all members in the current primary component that were also part of the prior primary component will have exactly identical lock state. Therefore, it is only necessary for only one of these members to broadcast its lock state.

In operation, when a new configuration is delivered, each member sends a state message with its version. Each member receives the message from all other members in the configuration. Each member determines the member with the maximum lock version. If there is a tie, the lexicographically first member ID is chosen to send its lock state. Other tie-breaking techniques associated with varying degrees of fairness can be used here as well.

Persistent data structures of this of the embodiment of the QCSM shown in FIG. 6 are as follows.

Forward Processing Member Set—The set of members that need to be present in the configuration in order to attain forward processing. Read from by: LMSM.DetermineFPMS( ), QSM.SendQuorumStateMessage( ). Written to by: LMSM.PersistFPMS( ), LMSM.PersistConfigurationAsFPMS( ).

Lock Slice—This is the set of locks and their owners, and the version assigned to this set of values. Read from by: QSM.SendLockMgrStateIfNewest( ). Written to by: QSM.OnRcvLockMgrState( ), QSM.PersistSlice( ).

Lock Slice Index—This is the index, or version, of the lock slice. This matches the index of the primary component in which the lock slice was written. Read from by: QSM.OnRcvLockMgrState( ), QSM.SendLockMgrStateIfNewest( ), QSM.SendQuorumStateMessage( ) (QSM). Written to by: QSM.OnRcvLockMgrState( ), QSM.PersistSlice( ).

Membership—This is the persistent record of the set of members that are part of the membership. Read from by: QSM.IsQuorum( ). Written to by: read only.

Primary Component—This is the last primary component that this member was a part of. This includes a configuration (a set of members) and a version, referred to as the primary component index. Read from by: QSM.PersistPrimaryComponent( ), QSM.SendQuorumStateMessage( ). Written to by: QSM.PersistPrimaryComponent( ).

Weight—The weight this member is assigned in the quorum calculation. Read from by: QSM.SendQuorumStateMessage( ). Written to by: read only.

Transient data structures of this of the embodiment of the QCSM shown in FIG. 6 are as follows.

Configuration—This configuration includes the set of members in the configuration, and also an ID that identifies the configuration. Messages that are sent by the state machines, as opposed to messages sent by the Extended Virtual Synchrony Transport, are sent and delivered in the same configuration in order to be applicable. If not, they are discarded. So the configuration is read routinely by the send and receive functions of the state machines. Read from by: HasReceivedAllStateMessages( ), PersistPrimaryComponent( ), SendLockMgrStateIfNewest( ). Written to by: OnRcvRegConf( ).

Forward Processing Member Set—The set of members that need to be present in the configuration in order to attain forward processing. The transient FPMS is determined when the QCSM exchanges quorum state, and is read later by the lock manager state machine when it tries to enter 'Forward Processing'. Read from by: LMSM.bIsFPMSPresent( ). Written to by: DetermineFPMS( ).

Quorum State Messages—When the configuration changes, each member in the new configuration exchanges its quorum state using these messages. Quorum State Messages are stored in a data structure that sorts them according to the sort order of the sending member. Read from by: DetermineFPMS( ), HasReceivedAllStateMessages( ), IsQuorum( ), SendLockMgrStateIfNewest( ). Written to by: OnRcvQuorumStateMessage( ), OnRcvRegConf( ).

Function definitions of this of the embodiment of the QCSM shown in FIG. 6 are as follows.

DetermineFPMS( )—Iterate over the set of quorum state messages. Read the FPMS from each message. Union each FPMS so that the superset of members included in the quorum state messages is formed. Store this in transient memory, the lock manager state machine will read it when it executes bFPMSIsPresent( ).

ForwardEnteringPrimary( )—Forward OnEnteringQuorum notification to the lock manager state machine.

ForwardRegConf(Configuration)—Forward OnRcvRegConf notification to the lock manager state machine.

ForwardTransConf(Configuration)—Forward OnRcvTransConf notification to the lock manager state machine.

HasReceivedAllStateMessages( )—True if the size of the data structure holding quorum state messages is the same as the size of the configuration, false otherwise.

IsQuorum( )—Iterator over the quorum state messages. Each quorum state message includes the sending member and the weight it is given in the quorum calculation. Retrieve these values. Each quorum state message includes the prior primary component of which the sending member was part. These are versioned using the primary component index; find the prior primary component with the greatest index. This primary component is used to determine if this configuration can attain quorum. There may not be a valid prior primary component on any of the quorum state messages if the system is coming up for the first time. If there was a prior primary component, the new configuration must include a weighted majority of the members present in the prior primary component in order to attain quorum. If there was no prior primary component, read the membership from persistent memory. Here, the new configuration must include a weighted majority of the members in the persistent membership in order to attain quorum.

OnRcvLockMgrState( )—Read the lock index from the lock state message. If this index is greater than the index on the persisted slice, then write the lock state and index from the lock state message to persistent memory as the new persisted lock slice. If this index is greater than the index on the transient lock state held by the lock manager state machine, then install the lock index and lock state from the lock state message onto the lock manager state machine as the new transient lock state.

OnRcvQuorumStateMessage( )—Store the quorum state message in transient memory.

OnRcvRegConf(Configuration)—Store the delivered configuration transiently. Initialize the data structure that will hold delivered quorum state messages. Call ForwardRegConf (Configuration).

OnRcvTransConf(Configuration)—Call ForwardTransConf(Configuration).

PersistPrimaryComponent( )—Read the current value of the primary component index from persistent memory. Increment this value; the result is the new value for the primary component index. Persist this new value, as well as the set of members in this configuration as the new primary component. Write the new value for the primary component index onto the lock manager state machine as the new index for the transient lock state. The index for the transient lock state mirrors the primary component index.

PersistSlice( )—Get the current set of lock owners from the transient memory of the lock manager state machine. Get the current primary component index from the transient memory of the lock manager state machine. Store these persistently as the new lock slice.

SendLockMgrStateIfNewest( )—If the size of the configuration is greater than 1 then lock state needs to be sent. If there is only one member in the configuration then lock state does not need to be sent. Iterate over the set of quorum state messages. Recall that the quorum state messages are sorted according to the sort order of the member that sent the message. Find the quorum state message with the highest lock index. Only one member needs to send a lock state message. If more than one member has lock state with the highest index, choose the first member in the sort order. If this member is the member that needs to send lock state, then determine which should be sent, the transient lock state of the lock manager state machine or the persisted lock slice. Read the index for both of these, send the newer lock state. If both the transient lock state and the persisted lock slice have the same index, prefer the transient lock state as it includes the whole lock queues, including waiters, rather than just the owners.

SendQuorumStateMessage( )—Create a new quorum state message, and send it. The data in the quorum state message includes the following: the last primary component of which this member was part (this is read from persistent memory and includes the set of members in the primary component and the primary component index); the weight of this member to use in the quorum calculation (this is retrieved from persistent memory); the forward processing member set of which this member was last a part (this is retrieved from persistent memory); and the maximum of the lock index held in transient memory by the lock manager state machine and the lock index on the persistent lock slice (the greater of these is the most up to date lock state that this member knows about). Lock Manager State Machine (LMSM)

FIG. 7 illustrates a lock manager state machine of FIG. 4, configured in accordance with one embodiment of the present invention. The LMSM can be implemented, for example, with software (e.g., C++), hardware (e.g., gate-level logic), or a combination of hardware and software (e.g., microcontroller with a number of embedded routines for carrying out functionality associated with the LMSM. For purposes of discussion, assume an Online Transaction Processing (OLTP) style of application using the FTDLM, where the application retries the transaction if the transaction rolls back. Assuming this model, the LMSM is used by the FTDLM to implement semantics under fault which guarantee mutual exclusion and ease of application correctness.

In more detail, the embodiment of the LMSM shown in FIG. 7 ensures that when the QCSM leaves the In primary component state, that (1) TransactionCompleted notifications from in-flight transactions are allowed to complete without error, and (2) new lock requests are either blocked or aborted. This LMSM also implements FPMS persistence and checking to ensure the fault tolerance previously discussed. This embodiment of the LMSM also implements transactional 2-phase-locking semantics to ensure the well-formed locking and releasing of multiple resources required to execute a transaction.

Transient data structures of this of the embodiment of the LMSM shown in FIG. 7 are as follows.

Configuration—The configuration is delivered by either a regular configuration message or a transitional configuration message and cached by the LMSM. Enqueue and dequeue messages sent by the LMSM need to be sent and received by the same configuration, otherwise they are discarded. So the configuration is read routinely by the send and received functions of the state machines. Read from by: bIsFPMSPresent( ), LQSM.OnReset(Configuration), PersistConfigurationAsFPMS( ), functions that send and receive LMSM messages. Written to by: CacheConfiguration( ).

InFlightTransactions—The set of transactions that are currently executing, or in-flight. Read from by: NotifyThreads( ), ProcessLock( ), ProcessTransactionCompleted( ). Written to by: CreateXact( ), ProcessTransactionCompleted( ), RollbackAllXacts( ).

LockIndex—The LockIndex is used to version the lock state. This index corresponds to the index of the primary component in which these lock queues were written. Read from by: QSM.OnRcvLockMgrState( ), QSM.PersistSlice( ), QSM.SendLockMgrStateIfNewest( ), QSM.SendQuorumStateMessage( ). Written to by: QSM.OnRcvLockMgrState( ), QSM.PersistPrimaryComponent( ).

LockState—The transient lock queues. Read from by: QSM.PersistSlice( ), QSM.SendLockMgrStateIfNewest( ). Written to by: QSM.OnRcvLockMgrState( ).

NextTransactionID—The next value to use as a transaction ID. Increments monotonically. This value can reset to 0 if the process fails; transactions are tracked in transient memory only. Read from by: CreateXact( ). Written to by: CreateXact( ).

Function definitions of this of the embodiment of the LMSM shown in FIG. 7 are as follows.

CacheConfiguration(Configuration)—A configuration is delivered by either a transitional or regular configuration message and written to transient memory.

CreateXact( )—Every transaction is represented by a Transaction object with a unique ID, the TransactionID. Get the next TransactionID, use it to instantiate a Transaction object for this transaction. Add the new transaction to a transient data structure holding the set of in-flight transactions. Increment the TransactionID.

DetermineFPMS( )—A new configuration has been delivered to the LMSM. Read the current FPMS from persistent memory. The new FPMS is the intersection of the current FPMS and the newly delivered configuration. That is, any members that are in the FPMS but not in the newly delivered configuration can be removed from the FPMS. The new FPMS is persisted with PersistFPMS( ) if it is different than the prior FPMS.

bIsFPMSPresent( )—The QCSM has entered the In primary component state and the LMSM is trying to enter the Forward Processing state. The LMSM reads the FPMS that the QCSM cached in DetermineFPMS( ) when the QCSM exchanged quorum state. If this entire set of members is present in the current configuration, then the LMSM can enter the Forward Processing state. If not, the LMSM stays in the Block New Transactions state until a primary component that includes all the members in the FPMS is formed.

NotifyThreads( )—The LMSM is entering the Forward Process state. Iterate over the set of in-flight transactions. Notify any threads that were blocked based on the state of the LMSM. Do not notify threads that were blocked because a lock was not available.

PersistFPMS( )—Take the result of DetermineFPMS( ) and write it to persistent memory as the FPMS.

PersistConfigurationAsFPMS( )—Read the configuration and write it to persistent memory as the FPMS.

ProcessLock(XactID, LockSet)—Retrieve the transaction from the set of in-flight transactions. If the transaction is not present then it has been rolled back, exception the invoking thread and return. If the member is forward processing, then call LQSM.OnLock(XactID, LockID) for each lock in the lock set. Otherwise block the invoking thread.

ProcessTransactionCompleted(XactID)—Retrieve the transaction from the set of in-flight transactions. If the transaction is not present then it has been rolled back, exception the invoking thread and return. If the transaction is a read only transaction (holds no locks), remove it from the set of in-flight transactions and return. If the member is forward processing, then, for each lock held by the transaction, call the lock queue state machine with OnTransactionCompleted(XactID). Remove the transaction from the set of in-flight transactions and return. Block the invoking thread as the member is not forward processing.

RollbackAllXacts( )—Clear the in-flight transactions data structure. Call the lock queue state machine action ClearTransactionState( ).

WaitForNotify( )—During configuration changes, and when a requested lock is not available, a thread requesting services from the LMST is blocked. WaitForNotify( ) blocks the invoking thread.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A distributed lock management system including a number of nodes each communicatively coupled to a network, the system comprising:
   a database at each node, for storing resources used by applications operating at one or more of the nodes;
   a fault tolerant distributed lock manager (FTDLM) module at each node, for regulating access to the resources by the applications, the FTDLM module having a queue for each resource, the queue identifying the node that owns distributed lock for that resource, wherein each queue is replicated across the nodes; and
   a total order transport module at each node, for communicatively coupling that node to the network, and imposing total ordering protocols on messaging between nodes.

2. The system of claim 1 wherein the queues in the FTDLM module are FIFO queues, and distributed lock ownership for each corresponding resource is transferred to waiting nodes identified in the queue in FIFO order.

3. The system of claim 1 wherein the total order transport module is implemented as an Extended Virtual Synchrony Transport.

4. The system of claim 1 wherein the total order transport module exploits multicast capabilities of the network to deliver messages with ordering guarantees.

5. The system of claim 1 wherein if a node owns distributed lock for a resource, and no other nodes are waiting for that resource, then the FTDLM module allows an unlimited number of transactions on that resource to run concurrently or sequentially.

6. The system of claim 1 wherein if a node X owns distributed lock for a resource, and other nodes are waiting for that resource, then the FTDLM module allows a predefined number of in-flight transactions on that resource to run and commit, and then releases ownership of the distributed lock.

7. The system of claim 6 wherein the node X is placed in the queue once the FTDLM module releases ownership of the distributed lock, and upon the other nodes completing use of the resource, node X re-acquires ownership of the distributed lock.

8. The system of claim 1 wherein when distributed lock ownership for a resource is transferred to a node, the FTDLM module allows all transactions waiting for that resource to execute concurrently.

9. The system of claim 1 wherein the total order transport module is integrated into the FTDLM module.

10. The system of claim 1 wherein after commit of all transactions at a node that are using a distributed lock, the FTDLM module keeps ownership of that lock at that node until or unless another node requests the distributed lock.

11. The system of claim 1 wherein the FTDLM module employs scheduling to ensure that resource access is distributed among the nodes with a degree of fairness.

12. The system of claim 1 wherein the FTDLM module allows N transactions to run before a distributed lock is released.

13. The system of claim 1 wherein the queues are updated in transient memory during normal forward processing.

14. The system of claim 13 wherein the queues are FIFO queues, and top elements of each queue are copied into and read from durable storage when faults are detected or are recovered from.

15. The system of claim 1 wherein the FTDLM module is capable of acquiring and releasing multiple distributed locks across nodes in one safe totally ordered broadcast by batching enqueues and dequeues of several distributed locks in a single multicast message.

16. The system of claim 15 wherein the single multicast message is used for a hierarchical lock ownership transfer.

17. The system of claim 1 wherein the resources stored in any one database can be concurrently accessed by applications operating on different nodes, and data consistency is maintained even in the face of process failure or network partitions.

18. The system of claim 1 wherein the system exploits extended virtual synchrony semantics of the total order transport to implement a membership quorum-based failure recovery system, where an agreed upon membership is persisted locally at each node.

19. The system of claim 1 wherein the FTDLM module further comprises:
a quorum calculation state machine coupled to the total order transport module, for guaranteeing mutual exclusion even in the face of network partitions and process failures, based on locally persisted membership;
n lock queue state machines, where n is the number of resources, each lock queue state machine for maintaining the queues and initiating ownership transfer of distributed locks; and
a lock manager state machine for acquiring distributed locks for an application requesting access to one or more of the resources, and notifying the appropriate lock queue state machine to process the request.

20. A distributed lock manager module for regulating access to resources by applications in a system including a number of nodes each communicatively coupled to a network, the module comprising:
a queue for each resource, the queue identifying the node that owns distributed lock for that resource, wherein each queue is replicated across the nodes; and
a total order transport module, for communicatively coupling its node to the network, and imposing total ordering protocols on messaging between nodes.

21. The module of claim 20 further comprising:
a quorum calculation state machine coupled to the total order transport module, for guaranteeing mutual exclusion even in the face of network partitions and process failures, based on locally persisted membership;
n lock queue state machines, where n is the number of resources, each lock queue state machine for maintaining the queues and initiating ownership transfer of distributed locks; and
a lock manager state machine for acquiring distributed locks for an application requesting access to one or more of the resources, and notifying the appropriate lock queue state machine to process the request.

22. The module of claim 20 further comprising:
durable storage for storing queue elements indicating current lock ownership when faults are detected or are recovered from.

23. The module of claim 22 wherein in cases where all nodes simultaneously crash, the module is further configured with FPMS (forward processing member set) capability, whereby a set of reachable nodes is persisted by each node on enter and exit to and from a quorum state, thereby enabling failure recovery despite total loss of transient state.

24. The module of claim 23 wherein an initial previous quorum is a complete membership, and a quorum state is established if a majority of a previous quorum is detected in a current set of reachable nodes.

25. The module of claim 20 wherein in cases where a failed node recovers and reattaches to an operational group, the module updates data of the recovering node by having an up-to-date node send the recovering node necessary data.

26. The module of claim 20 wherein the queues are FIFO queues, and distributed lock ownership for each corresponding resource is transferred to waiting nodes identified in the queue in FIFO order.

27. The module of claim 20 wherein the total order transport module is implemented as an Extended Virtual Synchrony Transport.

28. The module of claim 20 wherein the total order transport module exploits multicast capabilities of the network to deliver messages with ordering guarantees.

29. The module of claim 20 wherein if its node owns distributed lock for a resource, and no other nodes are waiting for that resource, then the module allows an unlimited number of transactions on that resource to run concurrently or sequentially.

30. The module of claim 20 wherein if its node owns distributed lock for a resource, and other nodes are waiting for that resource, then the module allows a predefined number of in-flight transactions on that resource to run and commit, and then releases ownership of the distributed lock.

31. The module of claim 30 wherein its node is placed in the queue once it releases ownership of the distributed lock, and upon the other nodes completing use of the resource, its node re-acquires ownership of the distributed lock.

32. The module of claim 20 wherein when distributed lock ownership for a resource is transferred to its node, the module allows all transactions waiting for that resource to execute concurrently.

33. The module of claim 20 wherein after commit of all transactions at a node that are using a distributed lock, the module keeps ownership of that lock at that node until or unless another node requests the distributed lock.

34. The module of claim 20 wherein the module allows N transactions to run before a distributed lock is released.

35. The module of claim 20 wherein the queues are updated in transient memory during normal forward processing.

36. The module of claim 20 wherein the module is capable of acquiring and releasing multiple distributed locks across nodes in one safe totally ordered broadcast by batching enqueues and dequeues of several distributed locks in a single multicast message.

37. The module of claim 36 wherein the single multicast message is used for a hierarchical lock ownership transfer.

38. The module of claim 20 wherein the module exploits extended virtual synchrony semantics of the total order transport to implement a membership quorum-based failure recovery system, where an agreed upon membership is persisted locally at each node.

39. A distributed lock manager method for regulating access to resources by applications in a system including a number of nodes each communicatively coupled to a network, the method comprising
   providing a queue for each resource;
   identifying, based on queue content, the node that owns distributed lock for the resource corresponding to that queue;
   replicating each queue across the nodes; and
   imposing total ordering protocols on messaging between nodes.

40. The method of claim 39 further comprising:
   guaranteeing mutual exclusion even in the face of network partitions and process failures, based on locally persisted membership;
   maintaining the queues and initiating ownership transfer of distributed locks; and
   acquiring distributed locks for an application requesting access to one or more of the resources, and processing the request.

* * * * *